US011235247B2

(12) United States Patent
Takagi et al.

(10) Patent No.: US 11,235,247 B2
(45) Date of Patent: Feb. 1, 2022

(54) GAME SYSTEM, PROCESSING METHOD, AND INFORMATION STORAGE MEDIUM

(71) Applicant: BANDAI NAMCO Entertainment Inc., Tokyo (JP)

(72) Inventors: Noriyoshi Takagi, Tokyo (JP); Shohei Ito, Kawasaki (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/739,246

(22) Filed: Jan. 10, 2020

(65) Prior Publication Data

US 2020/0147495 A1    May 14, 2020

Related U.S. Application Data

(63) Continuation of application No. PCT/JP2018/026061, filed on Jul. 10, 2018.

(30) Foreign Application Priority Data

Jul. 11, 2017    (JP) .............................. JP2017-135384

(51) Int. Cl.
*A63F 13/69*    (2014.01)
*A63F 13/5378*    (2014.01)
*A63F 13/65*    (2014.01)
*A63F 13/79*    (2014.01)

(52) U.S. Cl.
CPC .......... *A63F 13/69* (2014.09); *A63F 13/5378* (2014.09); *A63F 13/65* (2014.09); *A63F 13/79* (2014.09); *A63F 2300/205* (2013.01); *A63F 2300/609* (2013.01)

(58) Field of Classification Search
None
See application file for complete search history.

(56) References Cited

U.S. PATENT DOCUMENTS

2010/0227678 A1*  9/2010  Konishi .................. A63F 13/79
463/29

FOREIGN PATENT DOCUMENTS

| JP | 2008-043540 A | 2/2008 |
| JP | 2014-176513 A | 9/2014 |
| JP | 2016-43245 A | 4/2016 |

OTHER PUBLICATIONS

Nintendo, "Super Mario Maker," 2015, Nintendo, instruction manual (Year: 2015).*
IGN, "Super Mario Maker Wiki Guide," Aug. 24, 2015, IGN, https://www.ign.com/wikis/super-mario-maker/Question_Mark_Block (Year: 2015).*

(Continued)

*Primary Examiner* — Kevin Y Kim
(74) *Attorney, Agent, or Firm* — Oliff PLC

(57) ABSTRACT

A game system includes a processor including hardware. The processor performs: a moving body process of moving a moving body in a map of a game space; a game process that is a process of a game where a user is allowed to gain containers arranged in the map while moving the moving body in the map; and a container process that is a process on the containers. In the container process, the processor performs processes of determining the number of the containers, the types of the containers, the positions of the containers, and items to be assigned to the containers according to given selection conditions.

14 Claims, 18 Drawing Sheets

CONTAINER

CTA    RARE ITEM IS CONTAINED AT LOW PROBABILITY OF APPEARANCE.

CTB    RARE ITEM IS CONTAINED AT SIGNIFICANTLY LOW PROBABILITY OF APPEARANCE.

CTC    GOOD ITEM IS LIKELY TO APPEAR AS COMPARED TO GENERAL CONTAINER AT SLIGHTLY LOW PROBABILITY OF APPEARANCE.

CTD    GENERAL ITEM IS CONTAINED.

(56) References Cited

OTHER PUBLICATIONS

IGN, "Wii U Tech Specs," Feb. 27, 2014, IGN, https://www.ign.com/wikis/super-mario-maker/Question_Mark_Block (Year: 2014).*

"Dragon quest X: Royal family's labyrinth;" retrieved Sep. 20, 2018; <http://www7b.biglobe.ne.jp/~dqwiz/dq10/royal_labyrinth.html>.

"[DQX Ver 3.1 former part] Strategy summaries of 'Royal family's labyrinth: ally monster selection, another mode, area of dead world, and use of unnecessary augite as belt';" Aug. 22, 2015; retrieved Sep. 20, 2018; <http://dqxdb.net/blog/dq10_6001.html>.

"Live part 1 of 'Dragon Quest of the Stars' Start release today! First meeting play! 'Dragon Quest Application;'" Oct. 15, 2015; retrieved Sep. 20, 2018; <https://www.youtube.com/watch?v=TRDUgKyoXH0>.

Oct. 9, 2018 Search Report issued in International Patent Application No. PCT/JP2018/026061.

Apr. 6, 2021 Office Action issued in Japanese Patent Application No. 2017-135384.

Oct. 26, 2021 Office Action issued in Japanese Patent Application No. 2017-135384.

Digicube; "Breath of Fire V Dragon Quarter; The first Guide Book for Beginners"; Nov. 14, 2002.

\* cited by examiner

FIG. 6
CONTAINER
 CTA — RARE ITEM IS CONTAINED AT LOW PROBABILITY OF APPEARANCE.
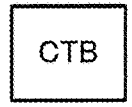 CTB — RARE ITEM IS CONTAINED AT SIGNIFICANTLY LOW PROBABILITY OF APPEARANCE.
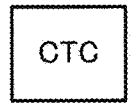 CTC — GOOD ITEM IS LIKELY TO APPEAR AS COMPARED TO GENERAL CONTAINER AT SLIGHTLY LOW PROBABILITY OF APPEARANCE.
 CTD — GENERAL ITEM IS CONTAINED.
FIG. 7A
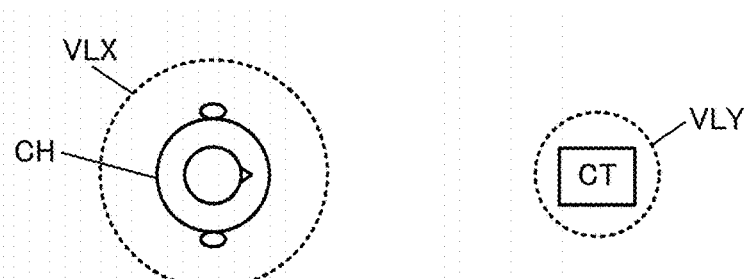
FIG. 7B
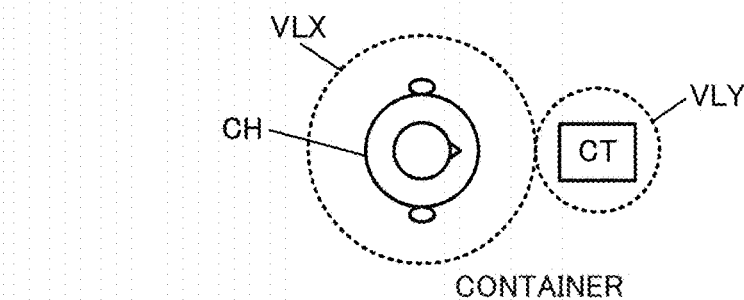

FIG. 8

| NUMBER OF CONTAINERS | MAXIMUM NUMBER | 6 |
|---|---|---|
| | MINIMUM NUMBER | 4 |
| CONTAINER LOTTERY PROBABILITY | CONTAINER CTA | 10%, MAXIMUM NUMBER IS ONE |
| | CONTAINER CTB | 20%, MAXIMUM NUMBER IS ONE |
| | CONTAINER CTC | 30%, MAXIMUM NUMBER IS THREE |
| ITEM LOTTERY PROBABILITY | CONTAINER CTA | ITR 10% / ITN 90% |
| | CONTAINER CTB | ITR 1% / ITN 99% |
| | CONTAINER CTC | ITG 20% / ITN 80% |
| | CONTAINER CTD | ITG 1% / ITN 99% |
| POSITIONS OF CONTAINERS | COORDINATE P1 | X=100  Y=250 |
| | COORDINATE P2 | X=200  Y=250 |
| | COORDINATE P3 | X=300  Y=250 |
| | COORDINATE P4 | X=500  Y=550 |
| | COORDINATE P5 | X=500  Y=650 |
| | COORDINATE P6 | X=500  Y=750 |

FIG. 9

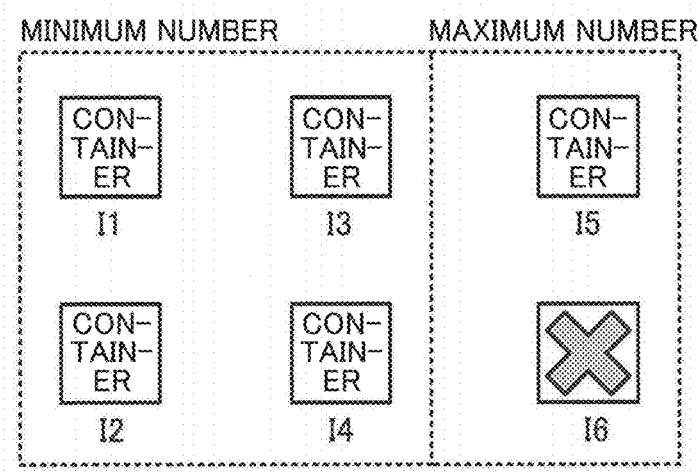

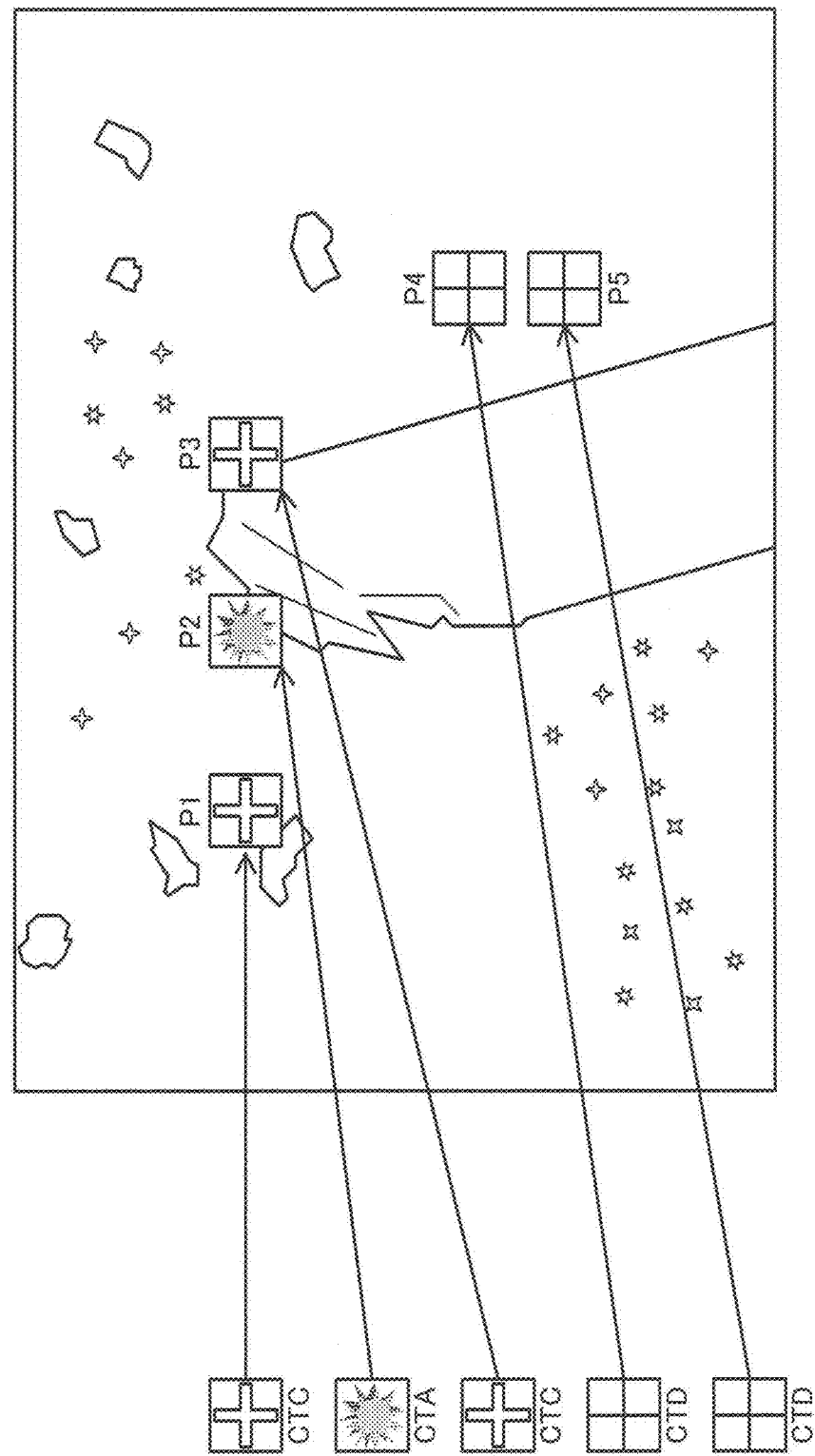

GAME SYSTEM, PROCESSING METHOD, AND INFORMATION STORAGE MEDIUM

CROSS REFERENCE TO RELATED APPLICATION

This application is a continuation of International Patent Application No. PCT/JP2018/026061, having an international filing date of Jul. 10, 2018, which designated the United States, the entirety of which is incorporated herein by reference. Japanese Patent Application No. 2017-135384 filed on Jul. 11, 2017 is also incorporated herein by reference in its entirety.

BACKGROUND

The disclosure relates to a game system, a processing method, an information storage medium, and the like.

There have been conventionally known games in which a character is moved in a map of a game space to gain items. Japanese Patent Application Publication No. 2008-43540 discloses an example of a conventional technique of a game system that implements such games.

In such games of gaining items, the number and positions of treasure chests arranged in the map are fixed, and the items as the contents of treasure chests are uniform. In addition, when a treasure chest is opened using the character, the item as a content appears right there, which makes it difficult to improve exciting and strategic aspects of the game.

BRIEF DESCRIPTION OF THE DRAWINGS

FIG. 6 is a diagram illustrating an example of types of containers.

FIGS. 7A and 7B are diagrams illustrating an example of a container gaining process.

FIG. 8 is a diagram illustrating container information.

FIG. 9 is a diagram illustrating a determination process of number of containers.

FIG. 15 is a diagram illustrating the determination process of positions of containers.

DESCRIPTION OF EXEMPLARY EMBODIMENTS

Figure 1A:
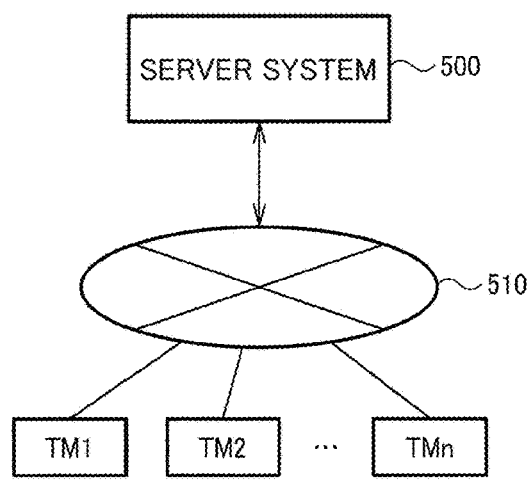
FIGS. 1A to 1E are diagrams illustrating a configuration example of a game system according to the present embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Game System

First of all, a configuration example of a game system according to the present embodiment will be described with reference to FIGS. 1A to 1E.

Referring to FIG. 1A, a server system 500 (information processing system) is communicably connected to terminal devices TM1 to TMn via a network 510. For example, the server system 500 is a host, and the terminal devices TM1 to TMn are clients. Hereinafter, the game system and its processing according to the present embodiment will be described on the assumption that the game system is mainly implemented by the server system 500. However, part or all of the game system and its processing may be implemented by the terminal devices TM1 to TMn. In addition, hereinafter, the terminal devices TM1 to TMn will be designated as terminal devices TM as appropriate.

The server system 500 can be implemented by one or more servers (management server, game server, charge server, service provision server, content distribution server, authentication server, database server, communication server, or the like). The server system 500 can provide various services for operating community-type web sites and online games, manage data necessary for game execution, and distribute client programs, various types of data, and others. This allows users to access the server system 500 to use a social networking service (SNS) from the terminal devices TM as user terminals and play a network game including a social game as an online game provided by the server system 500.

The network 510 (distribution network, communication line) is a communication channel using the internet or wireless LANs, and can include communication networks such as dedicated lines for direct connection (dedicated cables), LANs via Ethernet (registered trademark), telecommunication networks, cable networks, and wireless LANs. The communication method can be a wired or wireless method.

Figure 1B:
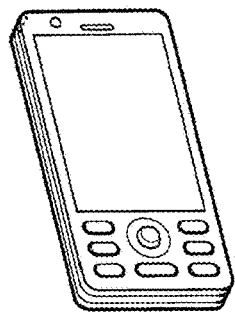
Figure 1C:
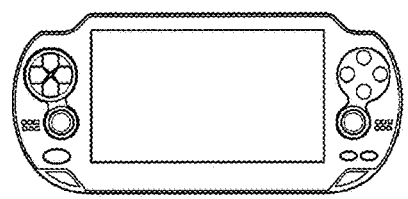
Figure 1D:
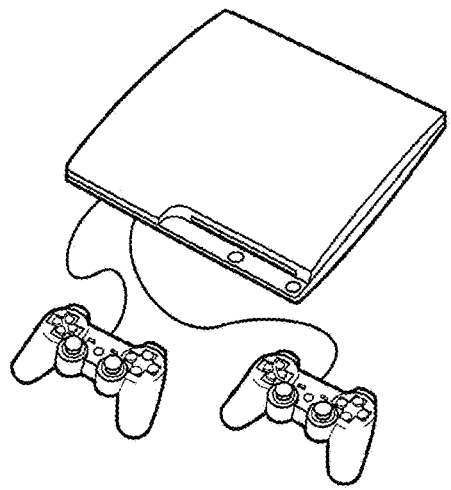
Figure 1E:
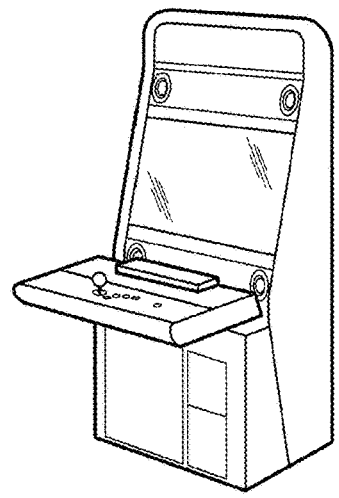

The terminal devices TM (user terminals, player terminals) are terminals that have a network connection function (internet connection function), for example. These terminal devices TM can be various devices such as portable communication terminals (smartphones and cell phones) as illustrated in FIG. 1B, portable game devices as illustrated in FIG. 1C, home-use game devices (stationary type) as illustrated in FIG. 1D, or arcade game apparatuses as illustrated in FIG. 1E, for example. Otherwise, the terminal devices TM may be information processing apparatuses such as personal computer (PCs) and tablet-type computers. Otherwise, the terminal devices TM may be wearable devices (head mounted displays (HMDs), watch-type devices, and the like) to be attached to the user's head or arm.

Figure 2:
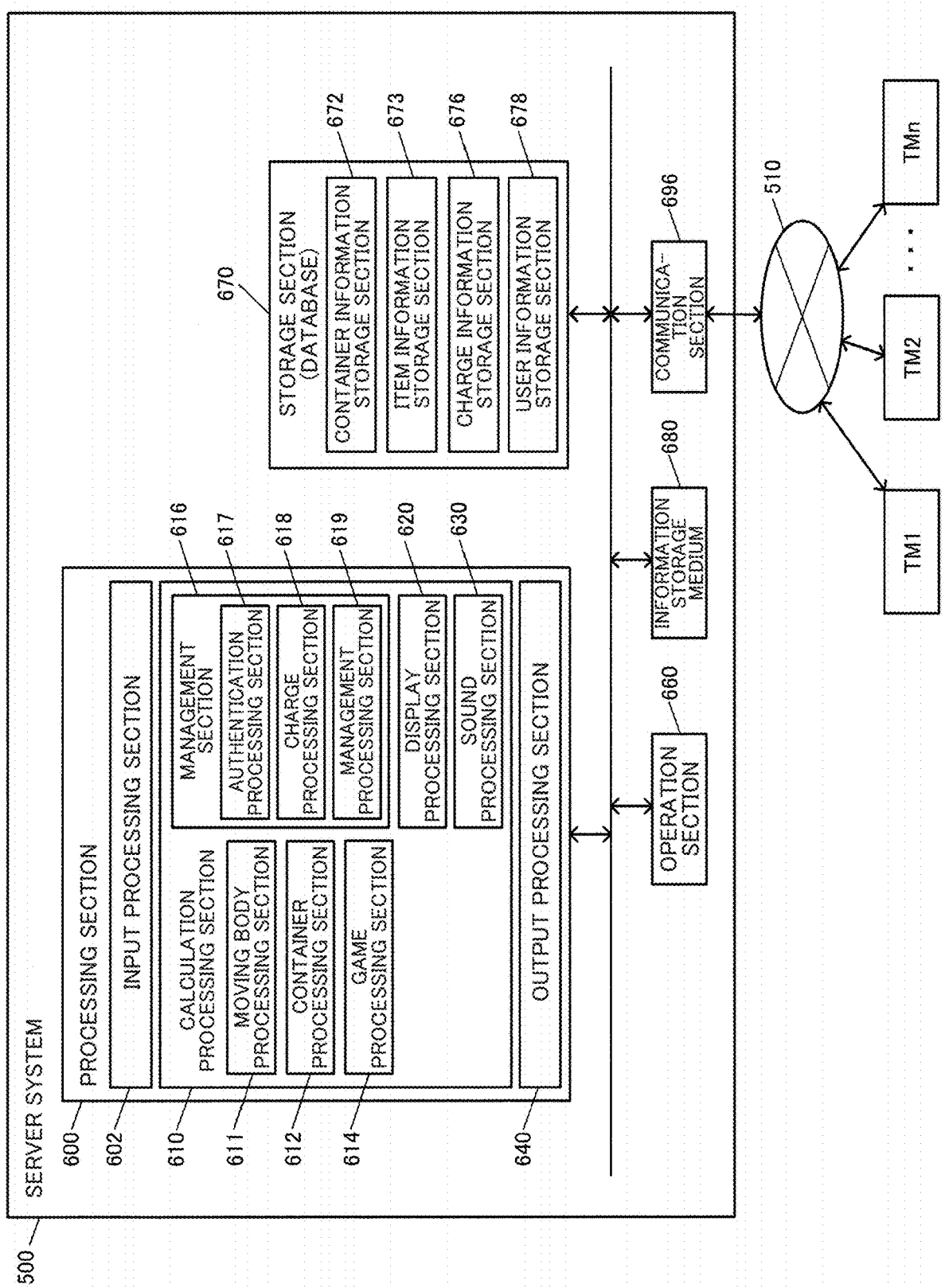
FIG. 2 is a diagram illustrating a configuration example of a server system according to the present embodiment.

FIG. 2 illustrates a configuration example of the server system 500 (game system) according to the present embodiment. The server system 500 includes a processing section 600, an operation section 660, a storage section 670, and a communication section 696. The configuration of the server system 500 is not limited to that illustrated in FIG. 2, and various modifications may be made by partially omitting the components (sections) of the server system, or by adding other components. The processes performed by the processing section 600 of the server system 500 may be implemented by processing sections 100 of the terminal devices TM illustrated in FIG. 3 and described later, or may be implemented as distributed processes by the processing section 600 of the server system 500 and the processing sections 100 of the terminal devices TM.

The processing section 600 (processor) performs a moving body process, a container process, a game process, a display process, a sound process, various control processes necessary for the server, or a management process, based on various types of information stored in the storage section 670 (database), programs, operation information, and others.

The processes (functions) according to the present embodiment performed by sections included in the processing section 600 (the processing section 100) can be implemented by a processor (processor including hardware). For example, the processes according to the present embodiment can be implemented by a processor that operates based on information such as a program and a memory that stores therein the information such as the program. For example, the processor may implement the functions of the sections in discrete hardware or in integrated hardware. For example, the processor may include hardware, and the hardware may include at least one of a circuit that processes a digital signal and a circuit that processes an analog signal. For example, the processor may include one or a plurality of circuit devices (such as an integrated circuit (IC) for example) or one or a plurality of circuit elements (such as a resistor and a capacitor, for example) mounted on a circuit board. For example, the processor may be a central processing unit (CPU). However, the processor is not limited to the CPU, and various processors such as a graphics processing unit (GPU) or a digital signal processor (DSP) may be used. The processor may be a hardware circuit such as an application specific integrated circuit (ASIC). The processor may include an amplifier circuit, a filter circuit, or the like that processes an analog signal. The memory (the storage section 670, 170) may be a semiconductor memory such as a static random access memory (SRAM) and a dynamic random access memory (DRAM) or may be a resistor. Furthermore, the memory may be a magnetic storage device such as a hard disk device (HDD) or may be an optical storage device such as an optical disc device. For example, the memory stores therein a computer-readable command, and the processes (functions) of the sections included in the processing section 600 (the processing section 100) are implemented with the processor executing the command. This command may be a set of commands forming a program, or may be a command for instructing an operation to a hardware circuit of the processor.

The processing section 600 includes an input processing section 602, a calculation processing section 610, and an output processing section 640. The calculation processing section 610 includes a moving body processing section 611, a container processing section 612, a game processing section 614, a management section 616, a display processing section 620, and a sound processing section 630. As described above, the processes according to the present embodiment performed by these sections may be implemented by a processor (or a processor and a memory).

The input processing section 602 performs, as input processes, an accepting process of operation information input from the operation section 660, a reading process of information from the storage section 670, and a receiving process of information via the communication section 696. For example, the input processing section 602 performs, as input processes, an acquiring process of the operation information detected by the operation section 660, a reading process of the information specified by a readout command from the storage section 670, and a receiving process of information via the network 510 from a device outside the server system 500 (a terminal device, another server system, or the like). The receiving process includes a process of instructing the communication section 696 to receive information, a process of acquiring the information received by the communication section 696, and a process of writing the information to the storage section 670.

The calculation processing section 610 performs various calculation processes. For example, the calculation processing section 610 performs calculation processes such as a moving body process, a container process, a game process, a management process, a display process, or a sound process.

The moving body processing section 611 (a program module for the moving body process) performs various processes on a moving body such as a character. The container processing section 612 (a program for the container process) performs various processes on containers for item gaining. The moving body processing section 611 and the container processing section 612 will be described later in detail.

The game processing section 614 (a program module for a game process) performs various game processes for the user to play the game. Examples of the game process include a process of starting the game when a game start condition is satisfied, a process of making the started game progress, a process of ending the game when a game end condition is satisfied, and a process of calculating a game result.

Taking a browser game as an example, the game processing section 614 manages user information for each user to control the progress of the game for each user. The game processing section 614 causes the terminal device TM to display a web page constituting a web site providing a game service in response to a request from the terminal device TM. Specifically, the web page is displayed on a display section 190 of the terminal device TM by a web browser included in the terminal device TM. When the user selects a hyper link to the displayed web page, the game processing section 614 transmits new HTML data corresponding to the hyper link to the terminal device TM. The terminal device TM displays the web page based on the new HTML data. In this manner, the game processing section 614 sequentially provides the web pages stored in the storage section 670 to the terminal device TM in response to the user's operation, which allows the game to proceed based on the user's operation on the terminal device TM.

The management section 616 (a program module for a management process) includes an authentication processing section 617, a charge processing section 618, and a management processing section 619. The authentication processing section 617 performs an authentication process of the user. For example, the authentication processing section 617 performs the authentication process of the user having logged in using the terminal device TM. The authentication process is performed based on a password, account information, or the like input by the user, for example. The charge processing section 618 performs various charge processes (a charge determination process, a charge data creation process, a saving process, and others). A charge information storage section 676 of the storage section 670 stores charge information as a target of the charge process by the charge processing section 618. The management processing section 619 performs various management processes of the server. For example, the management processing section 619 performs management processes of various types of information such as management processes of various services provided by the server and server management information.

For example, the user acquires an account by performing a predetermined procedure to use the services provided by the server system 500. The user logs in by an input of a password associated with the acquired account to play a network game such as a social game and lottery game, use services at a game site, and use various services such as online shopping of items and others, exchange of messages between users and registration of friend users. The management processing section 619 also performs a management process of account information of the user and the like.

The display processing section 620 (a program module for a display process) performs a process for displaying images on the display section of the terminal device TM and the like. For example, the display processing section 620 generates image generation data (HTML data and the like) for generating the images. Otherwise, the display processing section 620 may perform a control to display images on the display section of the terminal device TM and the like. The sound processing section 630 (a program module for a sound process) performs a process for outputting sounds from the sound output section of the terminal device TM and the like. For example, the sound processing section 630 generates sound generation data for generating the sounds (voice, game sounds, and sound effects). Otherwise, the sound processing section 630 may perform a control to output sounds from the sound output section of the terminal device TM and the like. The image generation data for generating images here refers to data for displaying the images generated by the method of the present embodiment on the terminal device TM and the like. The image generation data may be image data itself or may be various types of data used by the terminal device TM to generate the images (display screen setting data, object data, HTML data, and others). The same thing is applied to the sound generation data generated by the sound processing section 630.

The output processing section 640 performs output processes of various types of information. For example, the output processing section 640 performs a process of writing information into the storage section 670 and a process of transmitting information via the communication section 696 as output processes. For example, the output processing section 640 performs a process of writing the information specified by a write command into the storage section 670 and a process of transmitting information via the network 510 to a device outside the server system 500 (a terminal device, another server system, or the like). The transmission process includes a process of instructing the communication section 696 to transmit information and a process of designating to the communication section 696 information to be transmitted.

The operation section 660 is intended for the administrator (operator) of the system to input various types of information.

The storage section 670 stores various types of information. For example, the storage section 670 stores various types of information as a database. The storage section 670 also serves as a work area for the processing section 600, the communication section 696, and the like. The functions of the storage section 670 can be implemented by a semiconductor memory, an HDD, an SSD, an optical disc device, or the like.

The storage section 670 includes a container information storage section 672, an item information storage section 673, a charge information storage section 676, and a user information storage section 678. The container information storage section 672 stores container information as information about containers. The container information can include, for example, information on the number, types, or positions of containers (setting information on the number, types, or positions) and information on selection conditions of items to be assigned to the containers (container lottery probability information, item lottery probability information, and the like). The item information storage section 673 stores item information as information on items. The item information includes, for example, various types of game parameter information and image information on items. The game parameter information on items includes, for example, information on the rareness of items, information on the effects of items, or information on the performance (fighting strength, defensive force, and the like) and status of items. When the user gains a container or an item, the container information and the item information are stored in association with user information (user ID and the like), for example. The charge information storage section 676 stores information on the charge process performed by the charge processing section 618. The user information storage section 678 stores personal information of the user (name, gender, birth date, mail address, and the like) as user information. For example, the user information storage section 678 also stores the account information of the user (user ID) described above as user information. The charge information stored in the charge information storage section 676 is associated with the account information of each user (user ID).

An information storage medium 680 (computer-readable medium) is intended to store programs and data, and its functions can be implemented by an optical disc (CD, DVD, BD), HDD, a semiconductor memory (ROM), or the like, for example.

The communication section 696 communicates with the terminal device TM and the like via the wired or wireless network 510, and its functions can be implemented by hardware such as a communication ASIC or communication processor, or communication firmware.

Figure 3:
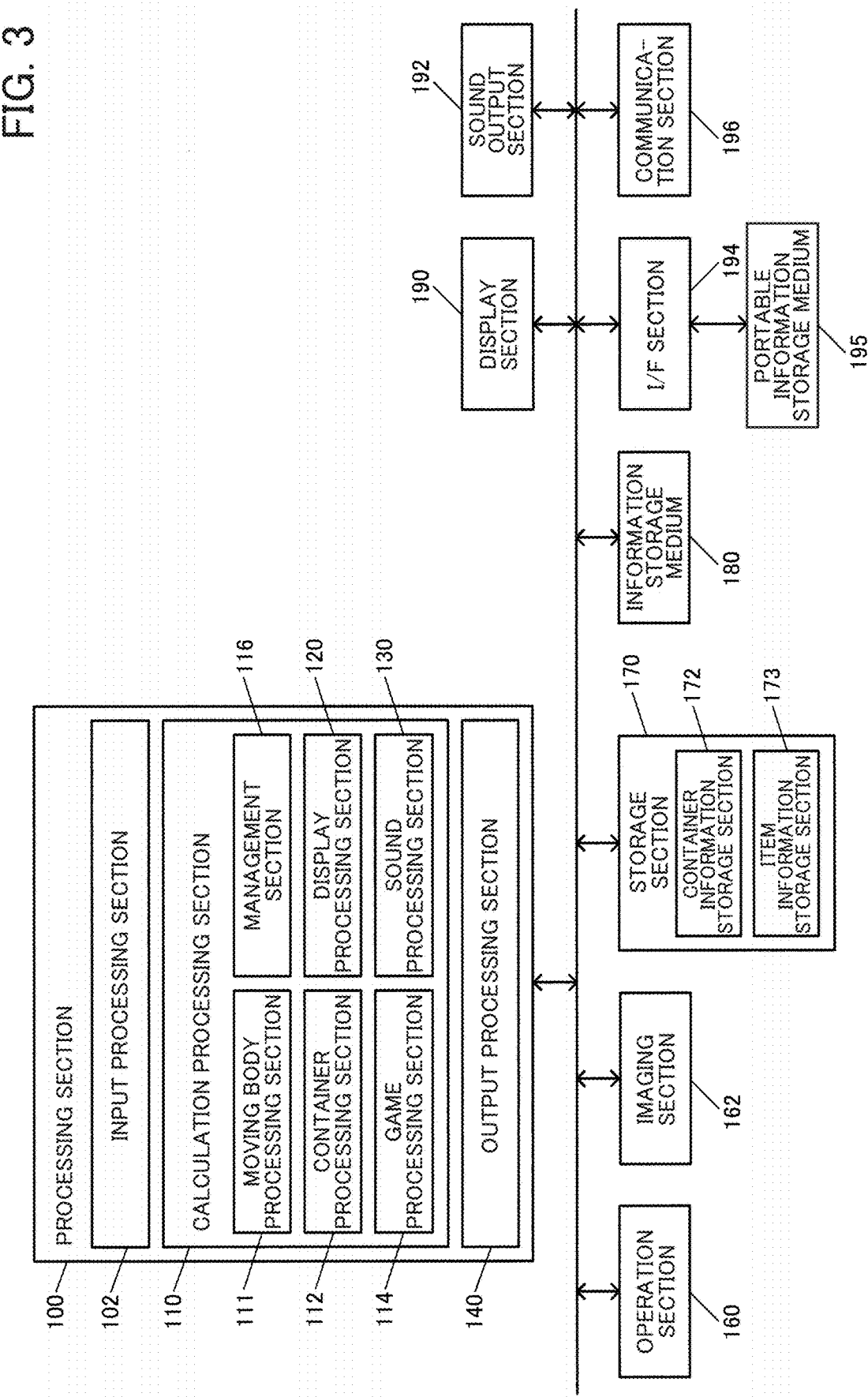
FIG. 3 is a diagram illustrating a configuration example of a terminal device according to the present embodiment.

FIG. 3 illustrates a configuration example of the terminal device TM (user terminal, client device, game device) of the present embodiment. The configuration of the terminal device TM is not limited to the one illustrated in FIG. 3 but can be modified in various manners such as omitting some of components (sections) or adding other components.

The terminal device TM includes a processing section 100, an operation section 160, an imaging section 162, a storage section 170, a display section 190, a sound output section 192, an I/F section 194, and a communication section 196.

The processing section 100 (processor) performs a display process or a sound process based on operation information from the operation section 160, programs, and others. The processing section 100 can be implemented by a processor or a processor and a memory like the processing section 600 described above and illustrated in FIG. 2.

The processing section 100 includes an input processing section 102, a calculation processing section 110, and an output processing section 140. The calculation processing section 110 includes a moving body processing section 111, a container processing section 112, a game processing section 114, a management section 116, a display processing section 120, and a sound processing section 130.

The input processing section 102 performs, as input processes, an accepting process of operation information input from the operation section 160, a reading process of information from the storage section 170, and a receiving process of information via the communication section 196. For example, the input processing section 102 performs, as input processes, an acquiring process of operation information detected by the operation section 160, a reading process of information specified by a readout command from the storage section 170, and a receiving process of information via the network 510 from a device outside the terminal device TM (a server system, another terminal device, or the like). The moving body processing section 111, the container processing section 112, the game processing section 114, and the management section 116 perform a moving body process, a container process, a game process, and a management process, respectively. The display processing section 120 performs a process for displaying images on the display section 190. For example, to generate images on the terminal device, the display processing section 120 performs a rendering process based on the results of various processes (an application process and a game process) performed by the processing section 100 to generate the images, and outputs the same to the display section 190. To generate images on the server, the display processing section 120 performs a process of displaying the images based on the image information from the server system on the display section 190. The sound processing section 130 performs a sound control based on the results of various processes performed by the processing section 100. Accordingly, the sound output section 192 outputs BGM, sound effects, or voice. The moving body process, the container process, the game process, the management process, the display process, the sound process, and the like in the present embodiment may be implemented by processes of either the server system 500 or the terminal device TM, or may be implemented by distributed processes of the server system 500 and the terminal device TM. For example, in a standalone game system not using a network, the terminal device TM as the game system performs the processes in the present embodiment.

The operation section 160 is intended for the user (player) to input various types of information such as the operation information, and its functions can be implemented by operation buttons, direction designating keys, analog stick, lever, various sensors (angular speed sensor, accelerometer, and others), microphone, or a touch panel display.

The imaging section 162 (camera) is intended to capture images of a subject, and is implemented by an image sensor such as CCD or CMOS sensor and an optical system including a focus lens and others.

The storage section 170 constitutes a work area for the processing section 100 and the communication section 196, and its functions can be implemented by a semiconductor memory, HDD, SSD, optical disc device, or the like. The storage section 170 includes a container information storage section 172 and an item information storage section 173.

An information storage medium 180 (computer-readable medium) stores programs and data, and its functions can be implemented by an optical disc, HDD, semiconductor memory, or the like. The processing section 100 performs various processes of the present embodiment based on the programs (data) stored in the information storage medium 180. The information storage medium 180 can store programs for causing a computer (a device including the operation section, the processing section, the storage section, and the output section) to serve as the sections in the present embodiment (programs for causing the computer to execute the processes of the sections).

The display section 190 is intended to output images generated in the present embodiment, and its functions can be implemented by a liquid crystal display (LCD), organic electroluminescence display, a cathode ray tube (CRT), HMD, or the like. The sound output section 192 is intended to output sounds generated in the present embodiment, and its function can be implemented by a speaker, headphone, or the like.

The interface (I/F) section 194 is intended to perform an interface process with a portable information storage medium 195, and its functions can be implemented by an I/F process ASIC or the like. The portable information storage medium 195 is intended for the user to save various types of information, and is a storage device that holds the information without power supply. The portable information storage medium 195 can be implemented by an IC card (memory card), USB memory, a magnetic card, or the like.

The communication section 196 is intended to communicate with the server system 500 and an external device such as another terminal device via the network 510, and its functions can be implemented by hardware such as a communication ASIC or a communication processor, or communication firmware.

The programs (data) for causing a computer to serve as the sections in the present embodiments may be distributed from the information storage medium possessed by the server system (host device) to the information storage medium 180 (or the storage section 170) via the network and the communication section 196. The use of the information storage medium by the server system can be included in the scope of the present disclosure.

In the present embodiment, as illustrated in FIG. 2, the server system 500 (terminal device TM) as the game system includes the moving body processing section 611 (the moving body processing section 111), the container processing section 612 (the container processing section 112), and the game processing section 614 (the game processing section 114). Hereinafter, a case where the game system in the present embodiment is implemented by the server system 500 will be described as an example. However, the present embodiment is not limited to this but the game system may be implemented by the terminal device TM or the distributed process of the server system 500 and the terminal device TM.

The moving body processing section 611 (the moving body processing section 111, this matter is also applied to the following description) performs a process of moving a moving body in a map of a game space. For example, the moving body processing section 611 performs a process of moving a moving body and a process of causing the moving body to act in the map of the game space (virtual space, object space). For example, the moving body processing section 611 performs a control process of moving a moving body (object) or causing a moving body to act (motion, animation) in the game space, based on the operation information input by the user through the operation section 160 of the terminal device, programs (movement/operation algorithms), various types of data (motion data), and others. Specifically, a simulation process is performed to sequentially obtain movement information (position, rotational angle, speed, or acceleration) and action information (a position and a rotational angle of a part object) of the moving body on a frame (for example, 1/60 seconds) by frame basis. The frame is a unit of time for performing a movement/action process (simulation process) of the moving body and an image generation process.

The moving body here refers to a display object representing a person, robot, monster, animal, vehicle (train, plane, or ship), or the like. For example, the moving body is a character operated by the user. For example, in the present embodiment, the moving body processing section 611 performs a process of arranging various objects representing display objects such as a moving body, a map (terrains, courses, walls, and water surfaces), and background (objects formed by polygons, free-form surfaces, or primitive surfaces such as subdivision surfaces) in the game space (virtual space). The moving body processing section 611 performs a process of moving a moving body such as a character in the map of the game space. The map refers to a field in the game space where a moving body moves. For example, the positions of objects constituting the map are set by map information (terrain information). The game space may be a game space set in the real space in a position information game described later, for example.

The game processing section 614 (the game processing section 114, this matter is also applied to the following description) performs a game process in a game where the user is allowed to gain containers arranged in the map while moving the moving body in the map. For example, the game processing section 614 performs a process in a game where the moving body is moved in the map by the operation information from the user and the moving body is caused to gain containers arranged in the map. For example, when the moving body approaches a container and it is determined that the moving body has contacted (hit) the container, the moving body is caused to gain the container. Alternatively, the user may specify the position of a container by the operation section 160 of the terminal device to gain the container, for example. When the operation section 160 is implemented by a touch panel, for example, the user may touch the position of a container on the screen of the terminal device to gain the container.

The container processing section 612 (the container processing section 112, this matter is also applied to the following description) performs a process on containers (display objects). The containers refer to display objects to which items are to be assigned, and are display objects representing containers such as boxes for storing items therein and the stored items, for example. The containers are not necessarily box-shaped display objects (treasure chests) but may be display objects of various shapes. For example, the containers can also include treasure chests in which the types of stored items are unknown, objects (display objects) arranged in the map, or buildings and farms appearing in a real-time strategy (RTS).

Each of the containers is set with a hit volume, for examples, so that it is possible to determine whether the container has been gained by the moving body such as a character by performing a hit check (crossing determination) of the hit volume set to the container and the hit volume set to the moving body. The items (game items, game media) are display objects usable in a game, and constitute elements of gameplay. For example, the items may be character items usable for the user as characters (moving bodies) or may be weapons, protections, equipment, tools, or parts attachable to the characters or the like. Otherwise, the items may be electronic cards (item cards, character cards) representing items or characters.

Specifically, the container processing section 612 performs processes of determining the number of containers, the types of the containers, the positions of the containers, and items to be assigned to the containers, according to given selection conditions. For example, the container processing section 612 performs processes of determining container arrangement information including at least one of the number and the positions of the containers, the types of the containers, and the items to be assigned to the containers, according to the given selection conditions. Specifically, the container processing section 612 performs processes of determining the number of the containers and determining the types and positions of the determined number of containers. When a container at one of the positions is gained by a moving body such as a character, the container processing section 612 performs a process of determining the item to be assigned to the type of the container and causing the user to gain the item. The item to be assigned to the container is an item gainable from the container, which is one or more items assumed to be stored in the container (treasure chest), for example. In this case, the container processing section 612 determines the types of the containers and the items to be assigned to the containers according to the given selection conditions. The selection conditions are conditions for use in a process of selecting the type of the container and a process of selecting the item to be assigned to the container. For example, when the selection process is a lottery process, the selection condition is set by the lottery probability information of the container and the lottery probability information of the item. In the determination process of the number of containers, the selection condition is a condition for use in the process of selecting the number of containers. For example, when the minimum number or maximum number of containers is to be set, the selection condition is a condition that the number of containers is selected between the minimum number and the maximum number. The selection condition may be set such that the minimum number and the maximum number are the same value. In the determination process of the positions of the containers, the selection condition is a condition for use in the process of selecting the positions of the containers. For example, the selection condition is a condition that the positions are selected at random from among a plurality of position candidates. These selection conditions can be set based on the container information stored in the container information storage section 672, for example.

For example, the container processing section 612 determines the number of containers, then determines one of the types and positions of the containers, and then determines the other of the types and positions of the containers. For example, after the determination of the number of containers, the container processing section 612 determines the types of the containers, and then determines the positions of the containers. Otherwise, after the determination of the number of containers, the container processing section 612 determines the positions of the containers, and then determines the types of the containers. Then, the container processing section 612 determines items to be assigned to the containers, and causes the user to gain the items. As a result, in some embodiments, the different number of containers can be arranged in each map of the game stage, for example. In a bonus stage, for example, it is possible to increase the number of containers as compared to the map in a general stage. Then, the container processing section 612 determines the types and positions of the set number of containers. This makes it possible to arrange the number of containers corresponding to the game stage and appropriately determine the types and positions of the set number of containers.

In addition, before the user starts the game (including at the start of the game), the container processing section 612 determines the number of containers, the types of the containers, and the positions of the containers. Then, in a period from the start of the game to the end of the game (including at the end of the game), the container processing section 612 determines the items to be assigned to the containers. As a result, in some embodiments, before the start of the game by the user (at the start of the game), it is possible to determine the number of the containers, determine the types and positions of the determined number of containers, and arrange the containers in the map. Accordingly, the user can play the game in which to gain the determined number and types of containers at the positions. The container processing section 612 determines the items as contents of the containers in the period from the start of the game to end of the game (at the end of the game). For example, immediately after the start of the game, the container processing section 612 determines the items to be assigned to the containers (items gainable from the containers). Otherwise, the container processing section 612 determines the items to be assigned to the containers with a timing after a lapse of a given period or a timing when a given event occurred after the start of the game. As a result, in some embodiments, after the start of the game, for example, it is possible to perform a process of changing the items to be assigned to the containers according to the game status or the like. Otherwise, the container processing section 612 determines the items to be assigned to the containers with a timing of end of the game. More specifically, on the condition that the game has ended, the container processing section 612 performs the determination process of the items to be assigned to the containers. As a result, in some embodiments, it is possible to determine the items to be assigned to the containers to the user having appropriately ended the gameplay and cause the user to gain the items.

The container processing section 612 also changes the items to be assigned to the containers or the selection conditions of the items according to the game result (game status). For example, depending on whether the game result of the user is good or poor, the container processing section 612 changes the items to be assigned to the containers to higher-value items (rare items or the like) or lower-value items (fry items or the like). Otherwise, depending on whether the game result of the user is good or poor, the container processing section 612 changes the item lottery probabilities as an item selection condition or changes the number of rare items stored in the containers as an item selection condition. As a result, in some embodiments, it is possible to change the items gainable by the user from the containers and the gaining modes in various manners according to the game result of the user.

The game system of the present embodiment includes the container information storage section 672 (the container information storage section 172, this matter is also applied to the following description) that stores number setting information and position setting information of the containers as the container information. The container number setting information is information for setting the number of containers, and is information about the minimum number and maximum number of containers, or the number of containers itself, for example. The container position setting information is coordinate information (two-dimensional coordinate information, three-dimensional coordinate information) that specifies the positions of the containers in the map. The container processing section 612 determines the number and positions of the containers based on the number setting information and the position setting information stored in the container information storage section 672. For example, the container processing section 612 performs the determination process of the number of containers based on the number setting information. For example, the container processing section 612 determines the number of containers to be a number between the minimum number and maximum number that are the number setting information. The container processing section 612 also performs the determination process of the positions of the containers based on the position setting information. For example, the container processing section 612 determines the positions of the set number of containers, from among a plurality of position candidates specified by the position setting information, and arranges the containers in the coordinates of the positions.

The container information storage section 672 also stores the container lottery probability information and the item lottery probability information as the container information. The container lottery probability information is information for setting the lottery probabilities and the like in the lottery process of the types of the containers. The item lottery probability information is information for setting the lottery probabilities and the like in the lottery process of items corresponding to the containers. The container processing section 612 determines the types of the containers and the items to be assigned to the containers based on the container lottery probability information and the item lottery probability information stored in the container information storage section 672. For example, the container processing section 612 determines the types of the containers by the lottery process based on the container lottery probability information, and determines the items to be assigned to the containers (the items gained from the containers) by the lottery process based on the item lottery probability information. As a result, in some embodiments, both the types of the containers and the items gained from the containers are determined by the lottery process so that the user can gain the items. This significantly improves exciting aspects of the item-gaining game.

The container processing section 612 sets the number of containers, the types of the containers, or the positions of the containers based on the user information of the user. Examples of the user information include the user's gameplay level (beginner, intermediate-level player, or skilled player), experience values gained in the game (status parameters), the play time of the game, the number of counts of gameplay, charge information of the user (the amount of costs for payment), or attribute information (water, soil, or fire). For example, the container processing section 612 changes the number of containers, the types of the containers, or the positions of the containers, depending on whether the user is at a high play level (game level) and with a high experience value or at a low play level and with a low experience value. Otherwise, the container processing section 612 changes the number of containers, the types of the containers, or the positions of the containers, depending on whether the user's play time is long or short or the number of counts of the user's gameplay is large or small. Otherwise, the container processing section 612 changes the number of containers, the types of the containers, or the positions of the containers, depending on the charge information indicating the costs for payment by the user to the charging. Otherwise, the container processing section 612 changes the number of containers, the types of the containers, or the positions of the containers, according to the attributes of the moving body such as a character used by the user or the like. This makes it possible to arrange the containers in the appropriate settings of number, types, or positions according to the user information.

The container processing section 612 also performs a change process of changing the number of containers, the types of the containers, or the positions of the containers based on the items or game points used by the user. For example, when the user acquires and uses a fee-charged special item or uses (spends) game points gained at the game, the container processing section 612 changes the number, types, or positions of the containers at the time of game start. For example, the container processing section 612 increases the number of containers, or changes the types of the items in the containers such that rarer items are likely to appear, or changes the positions to positions where the user can more easily gain the items. This makes it possible to further improve exciting and strategic aspects of the game.

When the change process has been performed, the container processing section 612 may also change the items to be assigned to the containers or the selection conditions of the items. For example, the container processing section 612 changes the items gainable from the containers and the selection conditions as conditions for gaining the items, in addition to the number, types, or positions of the containers. For example, as items gainable from the containers, rarer items can be made gainable. Otherwise, the container processing section 612 performs a change process of selection conditions for changing the lottery probabilities such that rare items or better items can be gained. As a result, in some embodiments, by using a special item such as a fee-charged item or game points, the user can change not only the number, types, or positions of the containers but also the items gained from the containers and the selection conditions of the items.

The container processing section 612 also changes the types of the containers, the items to be assigned to the containers, or the selection conditions of the items according to the game status after the arrangement of the containers in the map. For example, the number, types, and arrangement of the containers are set, and the game is started. Then, depending on whether the game status after the start of the game is good or poor, or depending on the degree of progress of the game, the types (contents) of the containers set before the start of the game are changed, the items to be assigned to the containers are changed, or the selection conditions such as the item lottery probability information are changed. For example, the container processing section 612 changes the types of the containers, the gainable items, and the selection conditions in real time according to the game status. Examples of the game status here include the status of progress of the game, or the status of attainment of the game (the clear status of the map, gained points), and the like. At the game using a moving body such as a character, examples of the game status include the status of a moving body in the game, the status specified based on the status parameters or the like of the moving body, and the like. At the game where a moving body moves, for example, the game status may be running status such as the running environment of the moving body.

The container processing section 612 also changes the types of the containers, the items to be assigned to the containers, or the selection conditions of the items according to the map information in the map at the positions of the containers. For example, the container processing section 612 changes the types of the containers, the items gained from the containers, and the selection conditions such as the lottery probabilities, according to the map information such as the terrain information (altitude or topography) or attribute information (water, ground, mountain, sea, and the like). For example, even for the same container, the type of the container, the item gainable from the container, and the selection condition as the condition for gaining the item vary according to the map information at the position of the container. The map information is stored in the storage section 670 (the storage section 170), for example. For example, the map information is stored in the storage section 670 in association with the container information.

In addition, when a given condition is satisfied during the game, the container processing section 612 may perform a process of changing the modes of the containers in real time or perform a process of presenting the items determined to appear from the containers to the user. For example, in response to an instruction from the container processing section 612, the display processing section 620 performs a display process of changing the modes of the containers (images, shapes, or effects) in real time, or performs a display process of displaying items determined to appear from the containers to the user. The given condition is satisfied, for example, when a change event of the modes of the containers has occurred, when a presenting event of the contents of the containers has occurred, when the game status of the user has become a given status, when the game result of the user has become a given result, or when the degree of game attainment by the user has reached a given degree of game attainment. As a result, in some embodiments, it is possible to allow the user to know the contents of the containers even when the modes of the containers such as display modes vary or even before the game is ended, thereby further improving exciting and strategic aspects of the game.

The game processing section 614 also performs a game process where a plurality of users play the game. For example, the game processing section 614 performs a game process of communal play in which a plurality of users fight a battle with an enemy group. Otherwise, the game processing section 614 may perform a game process of battle gameplay in which a plurality of users fight a battle with each other. The container processing section 612 performs a process of determining the number of the containers, the types of the containers, the positions of the containers, or the items to be assigned to the containers for each user of the plurality of users. In this case, the container processing section 612 may determine some of the number, types, and positions of the containers and the items to be assigned to the containers in such a manner as to be in common among the plurality of users, and may determine the others for each user of the plurality of users. For example, the container processing section 612 may determine the number, types, and positions of the containers in such a manner as to be in common among the plurality of users, and may determine the items to be assigned to the containers (the selection conditions of the items) for each user of the plurality of users.

The container processing section 612 also changes the items to be assigned to the containers or the selection conditions of the items according to the game result of each user. For example, the container processing section 612 changes the items gainable from the containers and the selection conditions (lottery probabilities) of the items, depending on whether the game result of the user is good or poor. For example, when the game result is good, the container processing section 612 causes the user to gain rare items and better items or changes the selection conditions such as lottery probabilities such that the user can gain rare items and better items. The game result is a result indicated by the achievement of the game played by the user or the points or scores gained at the game.

In the foregoing description, the moving body process, the container process, the game process, the management process, and others of the present embodiment are performed by the server system 500 illustrated in FIG. 2. However, the present embodiment is not limited to this. For example, some or all of the moving body process, the container process, the game process, the management process, and others of the present embodiment described above may be performed by the terminal device TM illustrated in FIG. 3. In this case, the terminal device TM (or the system in which the terminal device and the server system cooperate) serves as the game system of the present embodiment.

2. Method According to the Present Embodiment

Next, a method according to the present embodiment will be described in detail. The following description is mainly given as to an example where a moving body in motion in the map is a character and the method according to the present embodiment is applied to a battle game between the character (character group) and an enemy character (enemy character group). However, the present embodiment is not limited to this. For example, the moving body may be a moving display object such as a person or a robot other than a character, and the game to which the method according to the present embodiment is applied can also be applied to various games other than such a battle game.

2.1 Container Arrangement and Container Information

Figure 4:
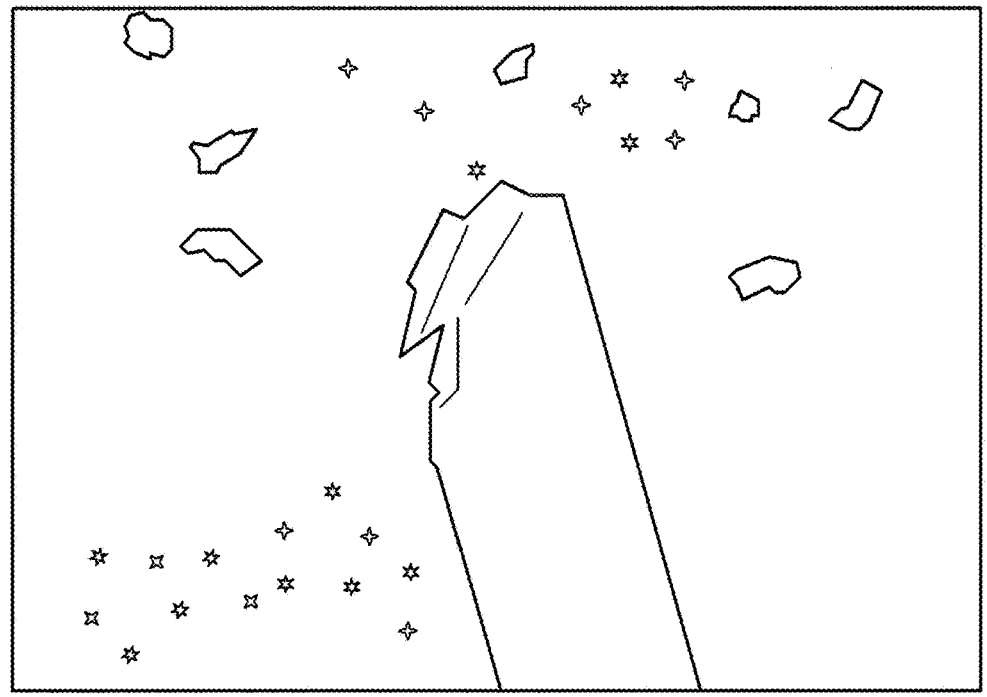
FIG. 4 is a diagram illustrating an example of a map used in the present embodiment.

FIG. 4 illustrates an example of a map used in the present embodiment. This map is a map representing a cosmic space, for example, and positions in the map are represented by three-dimensional coordinates, for example. In this map, there are arranged a plurality of objects (three-dimensional objects and the like) such as background objects constituting the map. Coordinate information on the positions of the plurality of objects, shape information of the objects, image information, and others are stored as map information in the storage section 670 illustrated in FIG. 2. As the map illustrated in FIG. 4, for example, a different map is used in each stage of the game. These maps are different in the positions, types, and others of the objects, for example.

Figure 5:
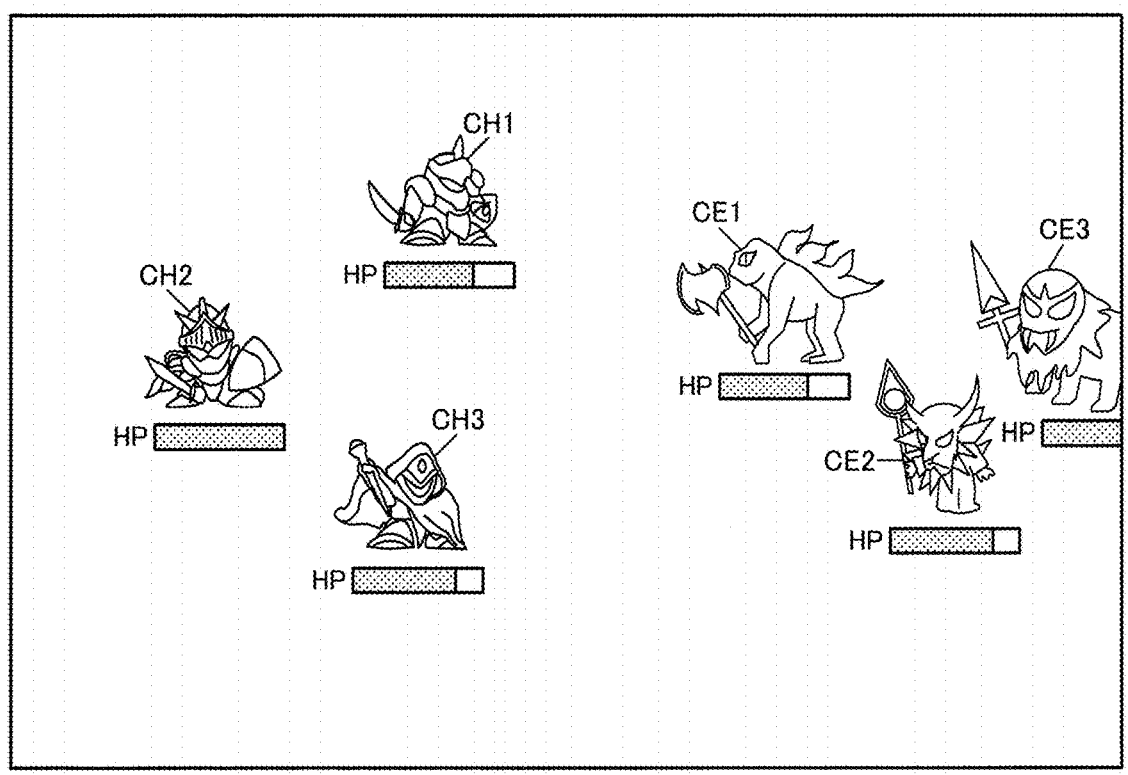
FIG. 5 is a diagram illustrating an example of a game image generated in the present embodiment.

FIG. 5 is a diagram illustrating an example of a game image generated in the present embodiment. This game image is displayed on the display section 190 of the user's terminal device. Referring to FIG. 5, for example, the user operates a character CH1, and characters CH2 and CH3 act as subordinate characters of the character CH1. These characters fight a battle with enemy characters CE1, CE2, and CE3. For example, when the display section 190 of the terminal device is a touch panel, the user touches a character as an attack target from among the enemy characters CE1 to CE3, and makes an attack on the character. For this end, a display button for specifying a special attack or special effect may be prepared, for example, so that the user touches the display button to cause the character CH1 or the like to make the special attack or special effect. In a multi-player mode, not in a single-player mode as described above, the plurality of users, for example, first, second, and third users may operate the characters CH1, CH2, and CH3, respectively. In addition, the enemy users, that is, fourth, fifth, and sixth users (or computers) operate the enemy characters CE1, CE2, and CE3, so that all the users play a battle game between the characters CH1 to CH3 and the enemy characters CE1 to CE3. In this case, the first to third users fight a battle with the enemies by communal play. The battle game illustrated in FIG. 5 is played at several sites in the map illustrated in FIG. 4, for example.

FIG. 6 illustrates an example of types of containers used in the present embodiment. Information on the types of the containers is stored as container information in the container information storage section 672, for example. For example, a container CTA is a container in which a rare item can be gained although the probability of appearance of the rare item is low. A container CTB is a container in which a rare item can be gained although the probability of appearance of the rare item is significantly low. A container CTC is a container in which a good item is likely to appear as compared in a general container CTD, although the probability of appearance is slightly low. The container CTD is a general container in which a general item is mainly contained. FIG. 6 illustrates an example of types of the containers. The types of the containers of the present embodiment are not limited to them, and may be modified in various manners. For example, the number of types of the containers may be two, three, or five or more. In addition, the items gainable from these types of containers and the probabilities of appearance (lottery probabilities) are not limited to those illustrated in FIG. 6.

FIGS. 7A and 7B are diagrams illustrating an example of a container gaining process. As illustrated in FIG. 7A, the character CH (the moving body in a broad sense) and the container CT are set with hit volumes VLX and VLY, respectively. As illustrated in FIG. 7B, when it is determined that the hit volumes VLX and VLY have hit (crossed) each other, it is determined that the character CH has approached the container CT, and the container CT is gained by the character CH. In this case, in the present embodiment, when the container CT is gained by the character CH, the item as the content of the container CT is not presented to the user at once. Then, as described later, the item assigned to the container CT is presented to the user at the end of the game. As a result, in some embodiments, the content of the container CT can be kept secret from the user until the end of the game. Then, presenting the item as the content at the end of the game makes it possible to cause a feeling of hope and surprise to the user, thereby enhancing exciting and strategic aspects of the game.

Referring to FIGS. 7A and 7B, the container CT is gained by the user when it is determined that the character CH has approached and contacted the container CT. However, the gaining process of the container CT of the present embodiment is not limited to this. For example, various modifications can be made such that the container CT is gained by the user using a touch panel or the like of the terminal device to specify the position of the container CT or that the container CT is gained by the user when the character CH has made an action such as an attack on the container CT.

FIG. 8 is a diagram illustrating an example of the container information stored in the container information storage section 672. The container information storage section 672 stores container number setting information and container position setting information as the container information. Referring to FIG. 8, the minimum number and maximum number of the containers are set as the container number setting information. The container processing section 612 determines the number of containers on the selection condition that the number of the containers is within a range of the minimum number to the maximum number. When the minimum number is four and the maximum number is six, the container processing section 612 determines the number of containers by performing a selection process such that the probabilities of the number of containers becoming four, five, and six are each ⅓ (33.333 . . . %). Referring to FIG. 8, coordinates P1 to P6 indicating the positions of the containers in the map illustrated in FIG. 4 are set as the container position setting information. FIG. 8 shows the coordinates P1 to P6 as two-dimensional coordinates for the convenience of description, but in actuality, the coordinates can be three-dimensional coordinates. For example, when it is determined that the number of containers is four, the container processing section 612 performs the selection process on the selection condition that four of the coordinates P1 to P6 are selected so that the four selected coordinates are set as the container positions. Similarly, when it is determined that the number of containers is five or six, the container processing section 612 performs the selection process on the selection condition that five or six of the coordinates P1 to P6 are selected so that the five or six selected coordinates are set as the container positions.

The container information storage section 672 also stores container lottery probability information as the container information. Referring to FIG. 8, as the container lottery probability information, the lottery probabilities and maximum numbers of the containers CTA, CTB, and CTC described above with reference to FIG. 6 are set. For example, in the container lottery process, the containers CTA, CTB, and CTC are to be hit at respective lottery probabilities of 10%, 20%, and 30%. However, the numbers of the containers CTA, CTB, and CTC cannot exceed one, one, and three, respectively, that are the maximum numbers. The selection condition in the determination process of types of containers is a condition that is set by the container lottery probability information (the container lottery probabilities, the maximum numbers), for example.

The container information storage section 672 also stores item lottery probability information as the container information. Referring to FIG. 8, as the item lottery probability information, the lottery probabilities of the items in the containers CTA, CTB, CTC, and CTD are set For example, as for the container CTA, the lottery probability of a rare item ITR is 10% and the lottery probability of a general item ITN is 90%, and thus the rare item ITR can be gained although the probability of appearance is low. As for the container CTB, the lottery probability of the rare item ITR is 1% and the lottery probability of the general item ITN is 99%, and thus the rare item can be gained although the probability of appearance is significantly low. As for the container CTC, the lottery probability of a good item ITG is 20% and the lottery probability of the general item ITN is 80%, and thus the good item ITG can be gained although the probability of appearance is slightly low. As for the container CTD, the lottery probability of the good item ITG is 1% and the lottery probability of the general item ITN is 99%, and thus the good item ITG appears at a significantly low probability but most of the appearing items are the general items ITN. As above, referring to FIG. 8, the plurality of candidate items (ITR, ITN, and ITG) are assigned to the containers CTA to CTD, and the selection condition in the item determination process is a condition for selecting items gainable by the user from among the plurality of candidate items, for example, a condition set by the item lottery probability information, for example.

2.2 Detailed Example of the Determination Process

Next, a detailed example of the determination process of the number, types, and positions of containers and the items to be assigned to the containers will be described with reference to FIGS. 9 to 16B. In the present embodiment, two lottery processes (selection processes in a broad sense) are performed. The first lottery process is a container lottery process of determining the types of the containers, and the second lottery process is an item lottery process of determining the items as the contents of the containers.

First, the container number setting information, the container lottery probability information, the item lottery probability information, and the container position setting information are set to the container information storage section 672 that is a database as described above with reference to FIG. 8.

Next, based on the minimum number and the maximum number in the container number setting information, the number of containers to be arranged in a map (field) of a game (quest) is determined at random. For example, referring to FIG. 8, the minimum number and maximum number of the number of the containers are set to four and six, respectively. Referring to FIG. 9, the number of containers is determined as five containers I1 to I5 by the determination process of number of containers. That is, the number of containers is determined as five within a range of four to six. The number of containers is determined at random, and the probabilities of determination as four, five, and six are ⅓ each. For example, in the present embodiment, the number of containers is determined at random in each map (quest) where the user plays the game. Thus, performing the determination process of number of containers as described above allows the number of containers to change at random in each map, thereby achieving a variety of container arrangements. Reference numbers I1 to I6 represent index numbers of the containers.

Figure 10A:
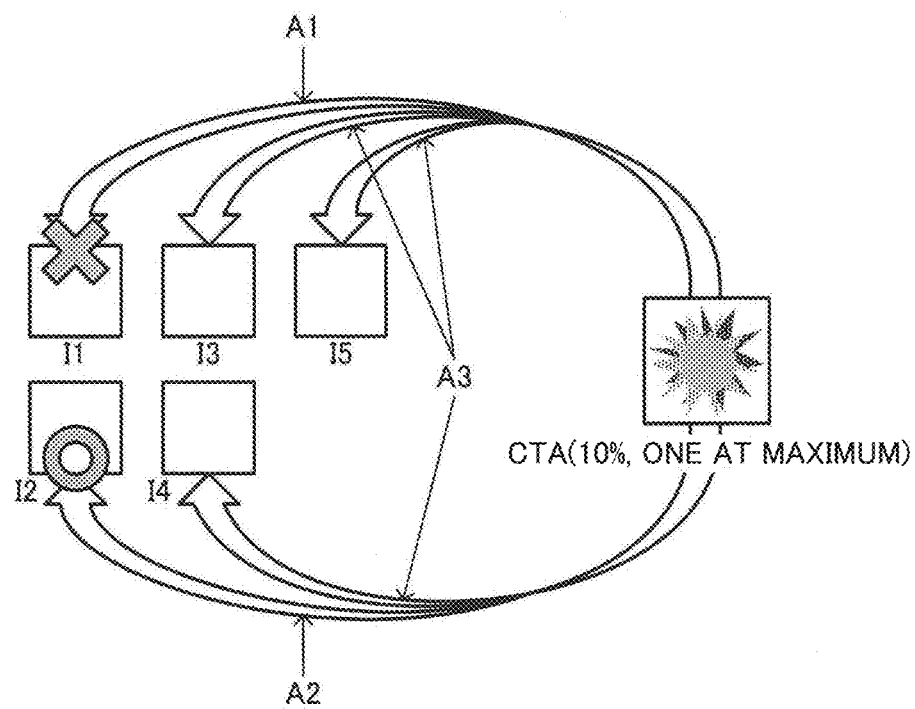
FIGS. 10A and 10B are diagrams illustrating a determination process of types of containers.
Figure 10B:
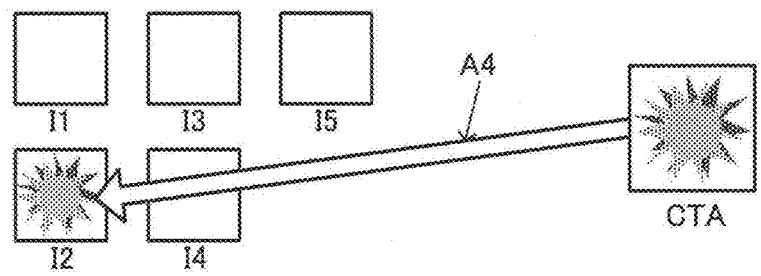

Next, the lottery process (selection process) of types of containers is performed. First, as illustrated in FIGS. 10A and 10B, the lottery process of the container CTA is performed using the lottery probability and maximum number of the container CTA illustrated in FIG. 8. The lottery probability of the container CTA is 10%. As a result of the lottery process, it is found that A1 is a blank and A2 is a hit as illustrated in FIG. 10A. The maximum number of the container CTA is one. Thus, when A2 has become a hit, the lottery process is over and the lottery process of A3 is not performed. Accordingly, as illustrated with A4 in FIG. 10B, the type of the container with I2 (index number) is determined as container CTA.

Figure 11A:
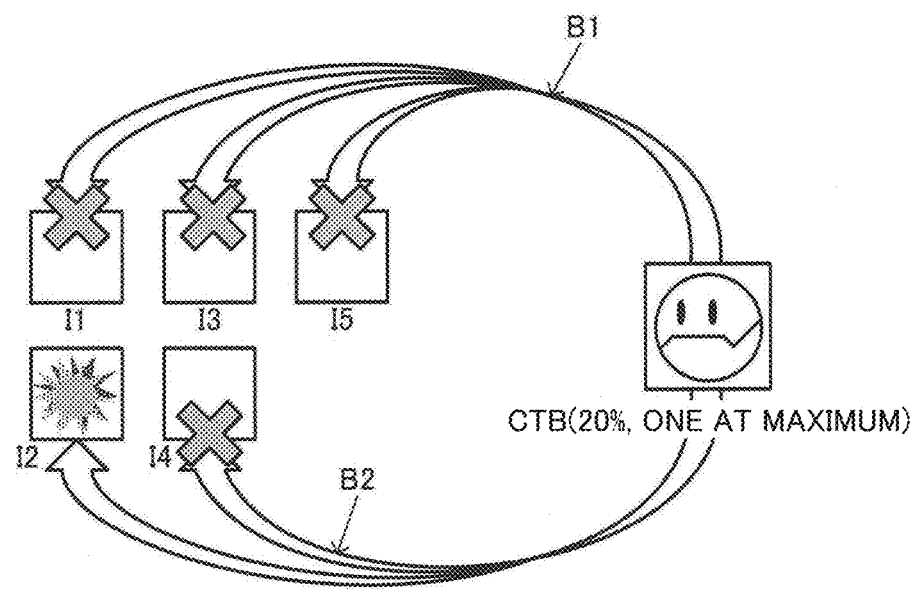
FIGS. 11A and 11B are diagrams illustrating the determination process of types of containers.
Figure 11B:
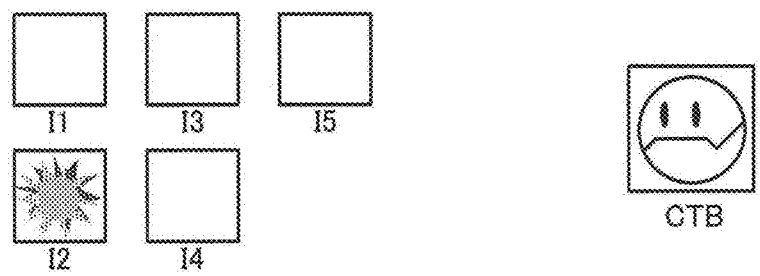

Next, as illustrated in FIGS. 11A and 11B, the lottery process of the container CTB is performed using the lottery probability and maximum number of the container CTB illustrated in FIG. 8. The lottery probability of the container CTB is 20%. As a result of the lottery process, it is found that B1 and B2 are all blanks as illustrated in FIG. 11A. Therefore, as illustrated in FIG. 11B, the container CTB is not assigned to I1 and I3 to I5.

Figure 12A:
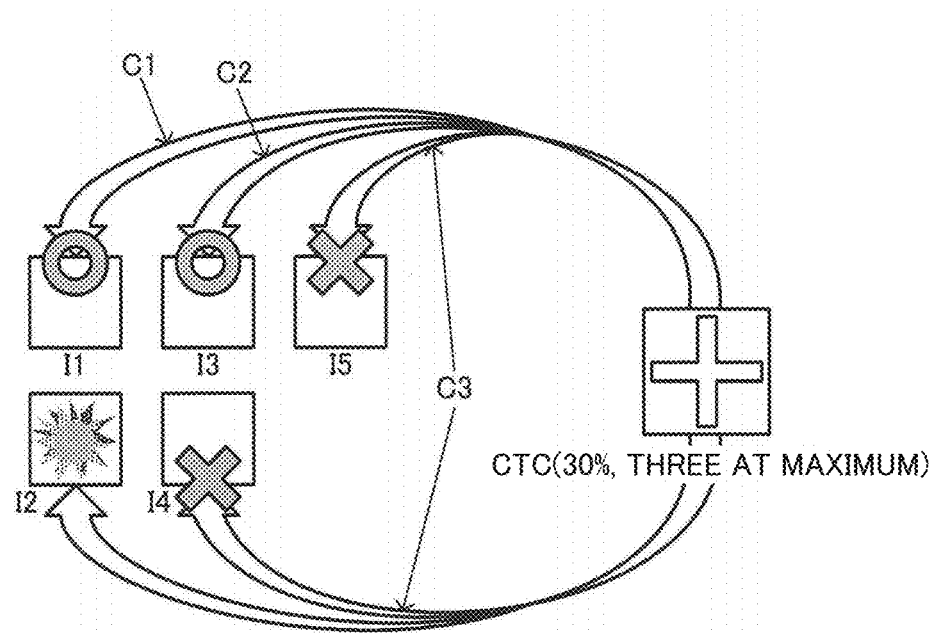
FIGS. 12A and 12B are diagrams illustrating the determination process of types of containers.
Figure 12B:
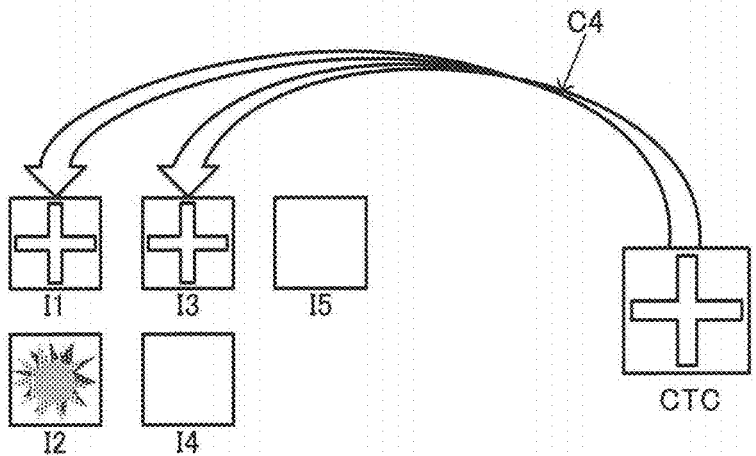

Next, as illustrated in FIGS. 12A and 12B, the lottery process of the container CTC is performed using the lottery probability and maximum number of the container CTC illustrated in FIG. 8. The lottery probability of the container CTC is 30%. As a result of the lottery process, it is found that C1 and C2 are hits as illustrated in FIG. 12A. In this case, the maximum number of the container CTC is three that is not yet reached by the hits at C1 and C2. Thus, the lottery process is further performed as shown with C3 but the result of this lottery process is a blank. Accordingly, as illustrated in FIG. 12B, the type of the containers with I1 and I3 is determined as container CTC.

Figure 13:
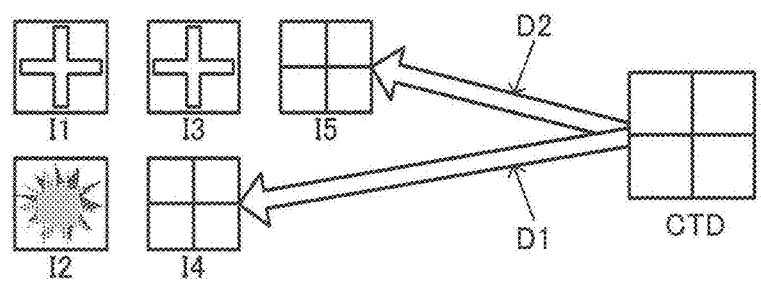
FIG. 13 is a diagram illustrating the determination process of types of containers.

Then, as illustrated in FIG. 13, the type of the remaining containers I4 and I5 is determined as general container CTD. Accordingly, the types of the containers I1, I2, I3, I4, and I5 are determined as CTC, CTA, CTC, CTD, and CTD, respectively.

Figure 14:
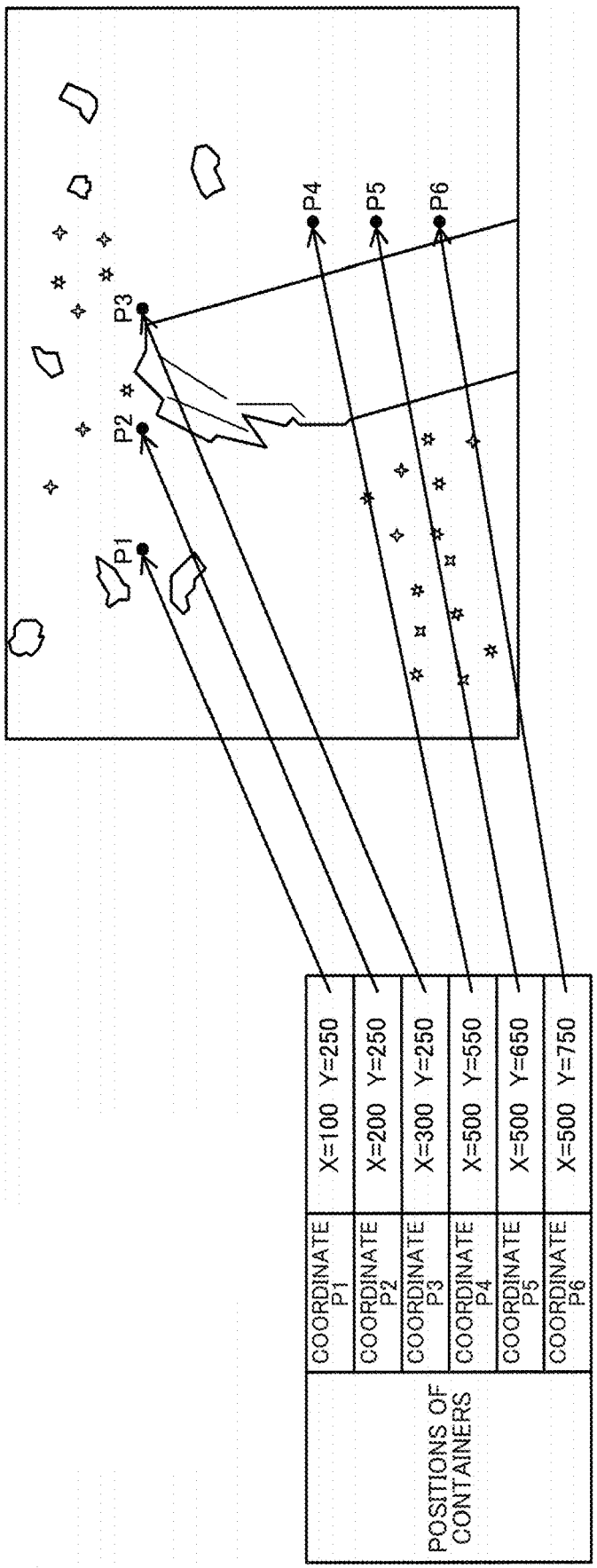
FIG. 14 is a diagram illustrating a determination process of positions of containers.

Next, the determination process of the positions of the containers is performed. Specifically, as illustrated in FIG. 14, the coordinates P1 to P6 of the positions are set based on the container arrangement setting information illustrated in FIG. 8. As illustrated in FIG. 15, it is determined that, of the coordinates P1 to P6, the containers CTC, CTA, CTC, CTD, and CTD are arranged at the coordinates P1 to P5, for example. This determination process is implemented by the random selection process of the positions.

Figure 16A:
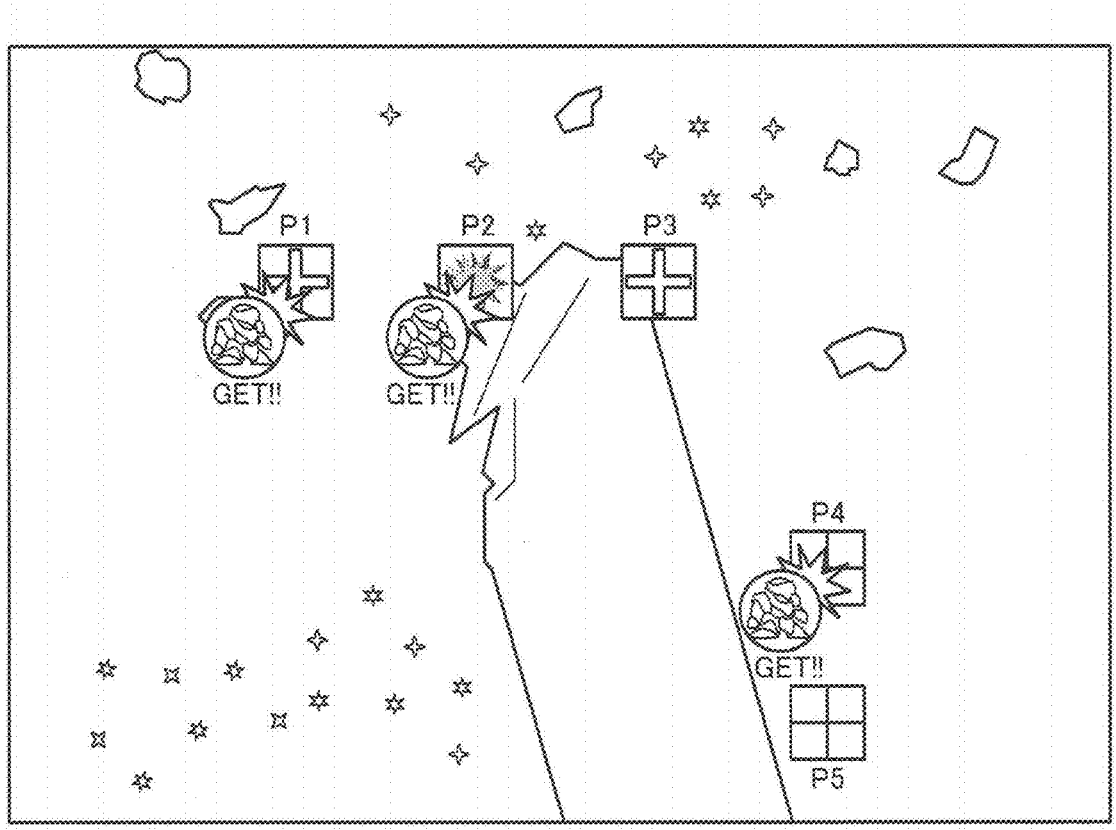
FIGS. 16A and 16B are diagrams illustrating a determination process of items to be assigned to containers.
Figure 16B:
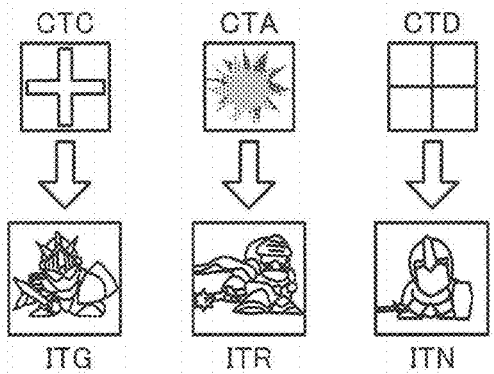

Finally, the lottery process (selection process) of the items to be assigned to the containers is performed. For example, as illustrated in FIGS. 16A and 16B, with a timing of end of the game, the lottery process of the items for each container is performed based on the item lottery probabilities illustrated in FIG. 8. For example, in the container CTC arranged at the coordinate P1 illustrated in FIG. 16A, the good item ITG (character item) is hit by the lottery process with an item lottery probability of 20% (see FIG. 8) as illustrated in FIG. 16B, whereby the user gains the item ITG. In the container CTA arranged at the coordinate P2, the rare item ITR is hit by the lottery process with an item lottery probability of 10%, whereby the user gains the rare item ITR. In the container CTD arranged at the coordinate P4, the general item ITN appears by the lottery process with an item lottery probability of 99%, whereby the user gains the general item ITN. In the containers CTC and CTD arranged at the coordinates P3 and P5, the items ITG and ITN are not hit by lottery, and thus the user does not gain these items. Then, the user can use the characters represented by the items ITG, ITR, and ITN gained as illustrated in FIG. 16B, as characters to be operated by the user himself/herself from the next game, for example.

Figure 17:
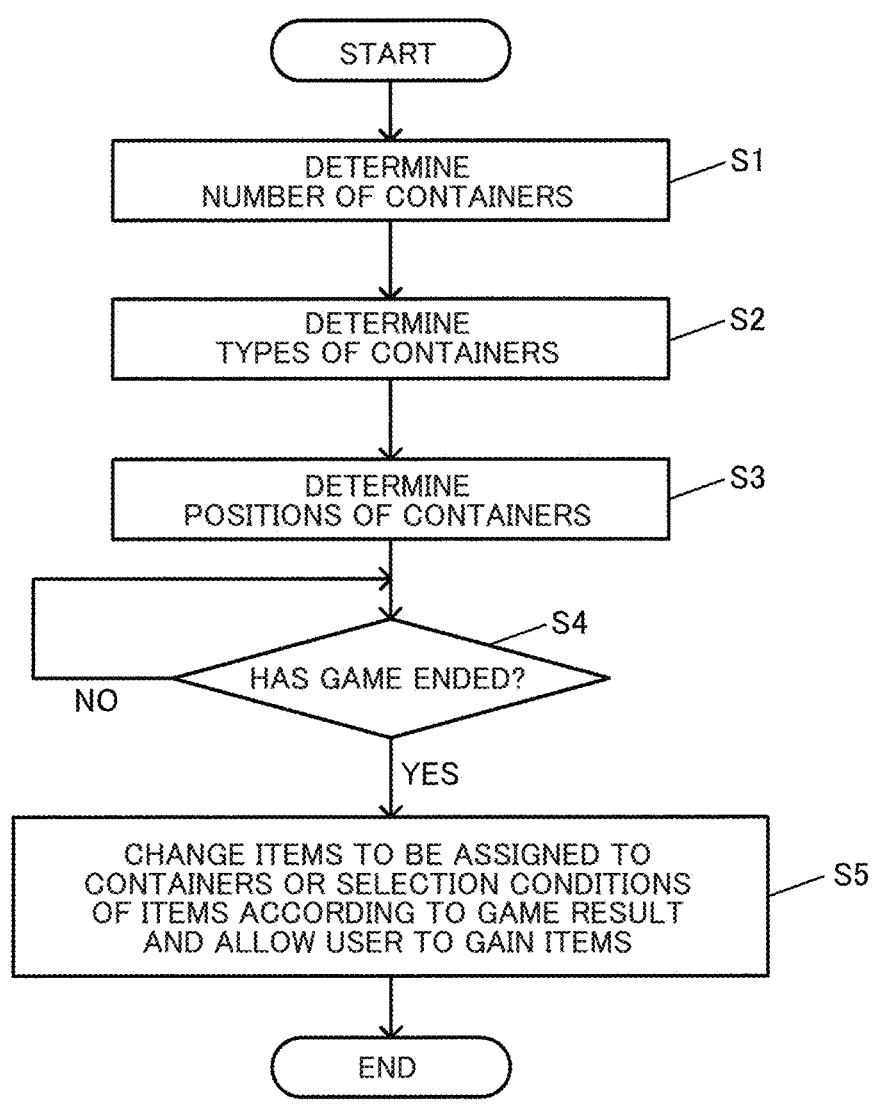
FIG. 17 is a flowchart illustrating a process example of the present embodiment.

FIG. 17 is a flowchart illustrating a process example of the present embodiment. First, the number of containers is determined (step S1). For example, the number of containers is determined by the determination process described above with reference to FIG. 9. Next, the types of the containers are determined (step S2). For example, the types of the determined number of containers are determined by the determination process described above with reference to FIGS. 10A to 13. Then, the positions of the containers are determined (step S3). For example, the positions of the containers are determined by the determination process described above with reference to FIGS. 14 and 15. After the determination of the number of containers, the positions of the containers may be determined and then the types of the containers may be determined.

Next, it is determined whether the game played by the user has been ended (step S4). When it is determined that the game has been ended, the items to be assigned to the containers or the selection conditions of the items are changed according to the game result, and the user is allowed to gain the items (step S5). For example, when the game result of the user is good, rarer items are set to be gainable or the lottery probabilities (selection conditions) of rare items and good items are increased. On the other hand, when the game result is poor, rare items are set to be less gainable or the lottery probabilities (selection conditions) of rare items and good items are decreased.

As described above, in the present embodiment, the game process of the game where the user is to gain containers arranged in the map while moving a character (moving body) in the map is performed. Then, the determination processes of the number, types, and positions of containers and the items to be assigned to the containers according to given selection conditions are performed. For example, the determination process of the number of containers illustrated in FIG. 9 is performed under the selection conditions set by the number setting information and the like in the container information illustrated in FIG. 8. The determination process of the types of the containers is performed as illustrated in FIGS. 10A to 13 under the selection conditions set by the container lottery probability information and the like in the container information. The determination process of the positions of the containers is performed as illustrated in FIGS. 14 and 15 under the selection conditions set by the position setting information and others in the container information. Then, the determination process of the items to be assigned to the containers is performed as illustrated in FIGS. 16A and 16B under the selection conditions set by the item lottery probability information and the like in the container information, and the user is allowed to gain the items. As a result, in some embodiments, the number, types, and positions of the containers in the map of the game are changed in various manners, and the items as the contents of the containers are changed in various manners as well. Therefore, it is possible to cause a feeling of surprise and unexpectedness to the user and improve exciting and strategic aspects of the game. For example, changing the number of containers makes it possible to provide a map in a bonus stage with a large number of containers or provide a map in a stage with a small number of containers. In addition, not one type of containers but a plurality types of containers are prepared and the types of the containers are changed. This improves the exciting aspect of the game in gaining the containers. Further, changing the positions of the containers makes it possible to improve the strategic aspect of the game. For example, it is possible to arrange containers on a route from the start point of the game in the map to a conquest point or arrange containers at positions not on the route in reverse. Therefore, the user is allowed to make different strategies in the game according to the settings of the positions of the containers, thereby improving the strategic aspect of the game. Even when the user gains a container, the item as the content of the container is not uniform but changes in various manners. Therefore, it is possible to elevate the user's expectation of the items gained from the containers and raise the user's enthusiasm for and immersion in the game. For example, even when the user gains a container, the item as the content of the container is not presented to the user at once but is presented to the user with a timing of end of the game. This makes it possible to cause a feeling of expectation and surprise to the user.

In the present embodiment, as illustrated in FIG. 17, first, the number of containers is determined, then the types of the containers are determined, and then the positions of the containers are determined. Otherwise, after the determination of the number of containers, the positions are determined, and then the types are determined. Performing the determination processes in this order makes it possible to appropriately set the number, types, and positions of the containers and implement the map in which the number, types, and positions of the containers are changed in various manners.

In the present embodiment, before the user starts the game (the game start timing), the number, types, and positions of the containers are determined. Then, in the period from the start of the game to the end of the game (the game end timing), the items to be assigned to the containers are determined. For example, referring to FIG. 17, with the game end timing, the items to be assigned to the containers are determined. As a result, in some embodiments, at the start of the game, the determined number and types of containers are arranged in the map at the determined positions, which allows the user to play the game using the map. The items to be assigned to the containers arranged in the map are determined in the period from the start to end of the game. Therefore, it is possible to change the items as the contents of the containers according to the game status after the start of the game and the game result, thereby improving the exciting and strategic aspects of the game. For example, as illustrated in FIG. 17, the items to be assigned to the containers are determined and the user is allowed to gain the items with the game end timing. Accordingly, the containers are treasure chests of which the contents are unknown until the game end timing. Then, informing the user of the item as the content of the container with the game end timing makes it possible to encourage the user's expectation and provide amusement for the user in hitting rare items and good items. The determination process of the items to be assigned to the containers may be performed before the game end timing, and the process of informing the user of the items to be assigned to the containers and allowing the user to gain the items may be performed with the game end timing (a given period including the end timing).

In the present embodiment, as illustrated in FIG. 17, the items to be assigned to the containers or the selection conditions of the items are changed according to the game result. For example, when the game result is good, the user is allowed to gain rare items and better items from the containers, or the selection conditions of the items are changed such that the probabilities of hitting rare items and good items become high. On the other hand, when the game result is poor, the user is not allowed to hit rare items and good items but is allowed to hit only general items, or the selection conditions of the items are changed such that the probabilities of hitting rare items and good items become low. As a result, in some embodiments, the items gainable from the containers are changed in various manners according to the game result, thereby implementing the gaining process of the items reflecting the game result. The game result is represented by the scores, acquired points, or degree of attainment of the game played by the user using the map, for example.

In the present embodiment, the determination processes of the number and positions of the containers are performed based on the number setting information and the position setting information stored in the container information storage section 672. For example, referring to FIG. 8, the minimum number and maximum number of containers are stored as the number setting information, and the coordinates of the container positions in the map are stored as the position setting information. Based on the number setting information, the determination process of the number of containers is performed as illustrated in FIG. 9. Based on the position setting information, the determination process of the positions of the containers is performed as illustrated in FIGS. 14 and 15. As a result, in some embodiments, storing the number setting information and the position setting information in the container information storage section 672 as a database makes it possible to arrange the appropriate number of the containers at the positions in each map where the user plays the game.

In the present embodiment, the determination processes of the types of the containers and the items to be assigned to the containers are performed based on the container lottery probability information and the item lottery probability information stored in the container information storage section 672. For example, referring to FIG. 8, the container lottery probabilities and the maximum number are stored as the container lottery probability information. In addition, the lottery probabilities (appearance probabilities) of the plurality of items associated with the containers are stored as the item lottery probability information. Based on the container lottery probability information, the determination process of the types of the containers (the container lottery process) as illustrated in FIGS. 10A to 13 is performed. Based on the item lottery probability information, the determination process of the items to be assigned to the containers (the item lottery process) as illustrated in FIGS. 16A and 16B is performed. As a result, in some embodiments, storing the container lottery probability information and the item lottery probability information in the container information storage section 672 as a database makes it possible to execute the determination process of the types of the containers and the items to be assigned to the containers with the container lottery probability information and the item lottery probability information as the selection conditions, thereby implementing the appropriate selection processes of the containers and the items.

2.3 Process Examples

Figure 18:
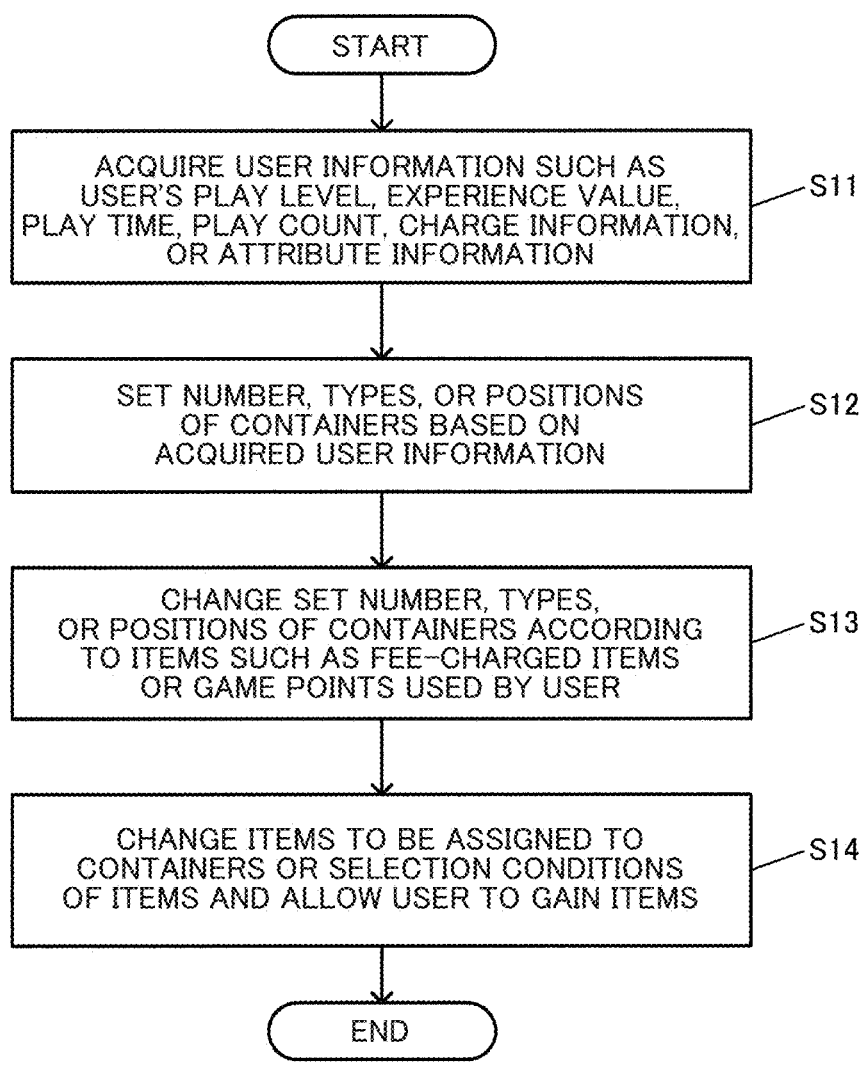
FIG. 18 is a flowchart illustrating a first process example of the present embodiment.

Next, various process examples of the present embodiment will be described. FIG. 18 is a flowchart illustrating a first process example of the present embodiment.

First, the user information such as the user's play level, experience value, play time, play counts, charge information, or attribute information is acquired (step S11). The user information is stored in the user information storage section 678 illustrated in FIG. 2, for example. Based on the acquired user information, the number, types, or positions of the containers are set (step S12). For example, the user information is reflected on the number, types, or positions of the containers arranged in the map. For example, the number, types, or positions of the containers are changed depending on whether the user is a high-level player or an entry-level player, the user has a high or low experience value, the user has a long or short play time, the user has a large or small number of play counts, the user has a large or small charge amount, or what attributes possessed by the user or his/her character, or the like. The set number, types, or positions of the containers are changed according to the items such as fee-charged items used by the user or the game points used (spent) by the user (step S13). For example, when fee-charged items or game points are used by the user, the number and types of the containers are increased or the types of the containers are changed such that rarer items appear or the lottery probabilities of items become high. Otherwise, the positions of the containers are changed to positions where the user can gain the containers more easily. In addition, the items to be assigned to the containers or the selection conditions of the items are changed to allow the user to gain the items (step S14). That is, when the number, types, or positions of the containers are changed by the use of fee-charged items or game points, the items gainable from the containers and the selection conditions for gaining the items are also changed.

As above, in the present embodiment, as illustrated in the steps S11 and S12 of FIG. 18, the number, types, or positions of the containers are set based on the user information (the game information of the user). This makes it possible to reflect the user information on the number, types, or positions of the containers arranged in the map, thereby allowing preferable arrangement of the containers for each user. For example, the containers can be arranged in the settings of the number, types, or positions reflecting the situation as to whether the user is a high-level player or an entry-level player, the user has a long or short time of gameplay or a high or low frequency of gameplay, the user has a large or small charge amount, or the user's attributes are suitable or the like.

In the present embodiment, as illustrated in the step S13 of FIG. 18, the change process of changing the number, types, or positions of the containers is performed according to the items and game points used by the user. In addition, as illustrated in the step S14, when the change process is performed, the items to be assigned to the containers or the selection conditions of the items are changed. As a result, in some embodiments, when the user uses a special item such as a fee-charged item or spends his/her game points, the number of the containers arranged can be increased, the types of the containers can be changed to be more advantageous to the user, or the positions of the containers can be changed to be more advantageous to the user's gameplay. Further, at this time, the items gainable from the containers are changed to rare items or better items, and the selection conditions for gaining the items are changed to be more advantageous to the user. Therefore, when the user uses a special item such as a fee-charged item or uses game points, the user can play the game for gaining containers and items in a more advantageous manner with enhanced immersion in and enthusiasm for the game.

Figure 19:
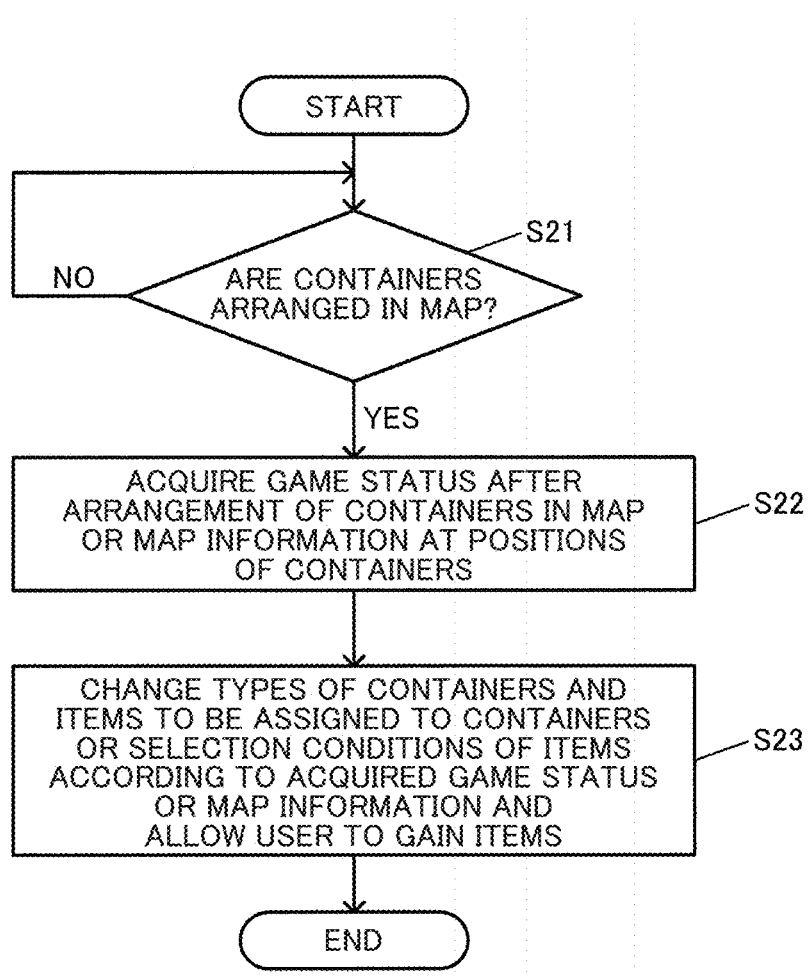
FIG. 19 is a flowchart illustrating a second process example of the present embodiment.

FIG. 19 is a flowchart illustrating a second process example of the present embodiment. When the containers are arranged in the map (step S21), the game status after the arrangement of the containers in the map or the map information at the positions of the containers is acquired (step S22). For example, information about the degree of progress of the game after the arrangement of the containers or whether the game status is good or poor for the user is acquired. In addition, the map information at the positions of the containers is read out from the storage section 670 illustrated in FIG. 2. For example, the map information such as map attribute information (water, soil, fire, and the like) and terrain information is read out at the positions of the containers. Then, according to the acquired game status or map information, the types of the containers, the items to be assigned to the containers, or the selection conditions of the items are changed, and the user is allowed to gain the items (step S23). For example, according to the degree of progress of the game, the types of the containers are changed, the items as the contents of the containers are changed, or the lottery conditions (lottery probabilities) in the lottery process as the selection conditions of the items are changed. Otherwise, when the game status of the user is good, the types of the containers are changed such that rare items and good items are gainable from the containers. Otherwise, when the game status is good, the items to be assigned to the containers are changed to rare items and good items or the selection conditions of the items such as lottery conditions are changed such that rare items and good items can be hit with high probabilities. When the attribute information of the map indicates a water attribute, the types of the containers are changed such that the items with the water attribute are gainable. Otherwise, when the attribute information of the map indicates a water attribute, the items to be assigned to the containers are changed to the items with the water attribute or the selection conditions of the items such as lottery probabilities are changed such that the items with the water attribute become likely to be hit. Similarly, when the attribute information of the map indicates a soil attribute or fire attribute, the types of the containers are changed such that the items with soil attribute or fire attribute are assigned, the items to be assigned to the containers are changed to the items with the soil attribute or fire attribute, or the selection conditions such as lottery probabilities are changed such that the items with the soil attribute or fire attribute become likely to be hit.

In this manner, in the present embodiment, the types of the containers, the items to be assigned to the containers, or the selection conditions of the items are changed according to the game status after the arrangement of the containers in the map or the map information at the positions of the containers. As a result, in some embodiments, it is possible to change the types of the containers or change the items gainable from the containers or the gaining mode of the items reflecting the game status after the arrangement of the containers in the map or the map information at the positions. Therefore, it is possible to change the types of the containers and the items gainable from the containers in various manners, thereby improving the exciting and strategic aspects of the game.

Figure 20:
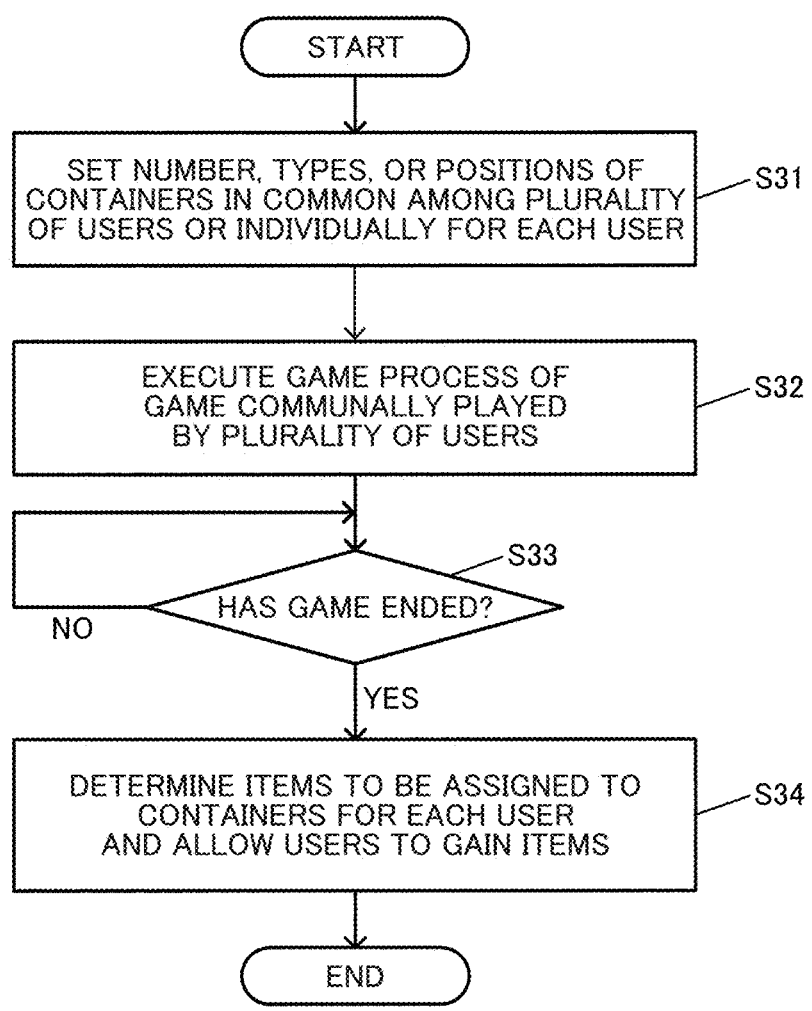
FIG. 20 is a flowchart illustrating a third process example of the present embodiment.

FIG. 20 is a flowchart illustrating a third process example of the present embodiment. First, the number, types, or positions of the containers are set in common among a plurality of users or individually for each user (for example, step S31). For example, when first and second users play a multi-player game, the number, types, or positions of the containers are set in common between the first user and the second user. Otherwise, the number, types, or positions of the containers are set differently between the first user and the second user. Then, the game process of the game communally played by the plurality of users is executed (step S32). For example, referring to FIG. 5, the game process is executed such that the first, second, and third users operate the characters CH1, CH2, and CH3, respectively, and communally fight a battle with the enemy characters CE1, CE2, and CE3. Then, it is determined whether the game has ended (step S33). When the game has ended, the items to be assigned to the containers are determined for each user, and each user is allowed to gain the items (step S34).

In this manner, in the present embodiment, the game process for a plurality of users to play the game is performed, and the number, types, or positions of the containers or the items to be assigned to the containers are determined for each user of the plurality of users. For example, referring to FIG. 20, the determination processes of the number, types, and positions of the containers are performed in common among the plurality of users, whereas the determination process of the items to be assigned to the containers is individually performed for each of the users. For example, in the step S31 illustrated in FIG. 20, even when the number, types, and positions of the containers are set in common among the plurality of users, the process of determining the items to be assigned to the containers is individually performed for each of the users. For example, the determination processes of the number, types, and positions of the containers described in FIGS. 8 to 15 are executed in common among the plurality of users. Therefore, the number, types, and positions of the containers are the same among the plurality of users. On the other hand, the selection process (lottery process) of the items gained from the containers described in FIGS. 16A and 16B is individually performed for each of the users. Accordingly, although the number, types, and positions of the containers are the same, the items gained from the containers are different among the users. Therefore, the items gained from the containers differ according to the user, thereby improving the exciting aspect of the game communally played by the plurality of users.

In this case, the items to be assigned to the containers or the selection conditions of the items may be changed according to the game result of each of the plurality of users. For example, for the user having been more actively involved in the communal play, rarer items or better items are assigned to the containers, as compared to the other users. Otherwise, the lottery probabilities of rare items and good items are increased. As a result, in some embodiments, at the game communally played by the plurality of users, it is possible to implement the gaining process of items reflecting the game result such as the degree of activity or contribution of each user. This improves the exciting aspect of the communally played game and the users' immersion in and enthusiasm for the game.

The method of the present embodiment is also applicable to a position information game. In this case, the map in the game space may be a map in the real world in the position information game.

For example, in the position information game to which the method of the present embodiment is applied, a plurality of points are set in regions selected based on map information (map screen). In addition, routes are set for a tour of the plurality of points. For example, referring to FIG. 21, a plurality of points are set near a regional station, and routes RT1, RT2, and RT3 are set for a tour of the plurality of points.

Figure 21:
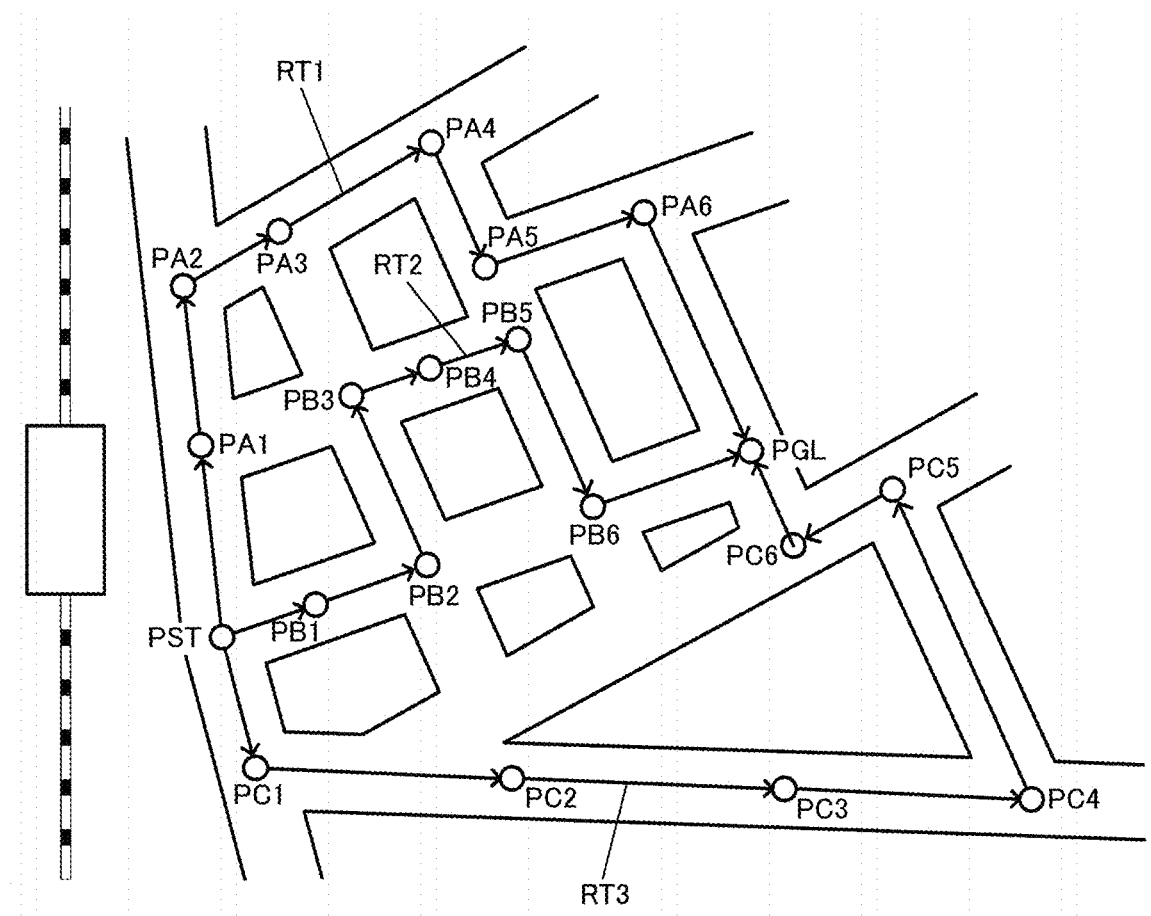
FIG. 21 is a diagram illustrating an example of application of a method according to the present embodiment to a position information game.

The route RT1 illustrated in FIG. 21 is a route starting from a point PST as a start point, passing through points PA1, PA2, PA3, PA4, PA5, and PA6 in this order, and reaching a point PGL as a goal point. The route RT2 is a route starting from the point PST as a start point, passing through points PB1, PB2, PB3, PB4, PB5, and PB6 in this order, and reaching the point PGL as a goal point. The same applies to the route RT3.

In the position information game, events occur at the points in the routes RT1, RT2, and RT3. Examples of the events include an event of fighting a battle with an appearing enemy character as illustrated in FIG. 5, and an event of the appearance of a container. The user plays the game while enjoying events occurring at these points (point-tour game) along the routes. Specifically, events occur corresponding to points (PST, PA1 to PA6, PGL, and others) for the user moving through the plurality of points according to the position information of the user. For example, the user moves through the plurality of points (routes) while carrying a terminal device such as a portable information terminal device (smartphone, portable game device, or the like). When it is detected that the user in motion is located in a place corresponding to a point, the event associated with the point occurs. For example, an image corresponding to the event is displayed on the display section of the terminal device, or a sound corresponding to the event is output from the terminal device. For example, a detection range including a point (point position) is set for the point. When it is determined that the user has entered the detection range based on the position information of the user, the event corresponding to the point occurs. This allows the user to enjoy the game where events occur at individual points. In the case of applying the method of the present embodiment to such a position information game, a plurality of containers are arranged for a plurality of points and the like in the map illustrated in FIG. 21. Then, the processes of determining the number, types, and positions of the containers and the items to be assigned to the containers are performed according to given selection conditions.

In accordance with one of some embodiments, there is provided a game system comprising a processor including hardware, the processor being configured to perform: a moving body process of moving a moving body in a map of a game space; a game process that is a process of a game where a user is allowed to gain containers arranged in the map while moving the moving body in the map; and a container process that is a process on the containers, in the container process, the processor performs processes of determining the number of the containers, the types of the containers, the positions of the containers, and items to be assigned to the containers, according to given selection conditions.

In accordance with one of some embodiments, it is possible to implement a game that allows the user to gain containers arranged in the map of the game space. The number, types, and positions of the containers and the items to be assigned to the containers in the map are determined according to given selection conditions. Therefore, the user can gain the items to be assigned to the containers by gaining the containers arranged in the map. Determining the number, types, and positions of the containers and the items to be assigned to the containers according to given selection conditions makes it possible to make versatile the arrangement form of the containers and the items gainable from the containers, thereby improving exciting and strategic aspects of the game.

In accordance with one of some embodiments, there is provided the game system, wherein, in the container process, the processor may determine the number of the containers, then may determine one of the types and positions of the containers, and then determines the other of the types and positions of the containers.

As a result, in some embodiments, it is possible to arrange the number of containers according to the game stage and appropriately determine the types and positions of the number of the containers.

In accordance with one of some embodiments, there is provided the game system, wherein, in the container process, the processor may determine the number of the containers, the types of the containers, and the positions of the containers before the user starts the game, and may determine the items to be assigned to the containers in a period from the start of the game to the end of the game.

As a result, in some embodiments, it is possible to, before the start of the game by the user, determine the number of the containers, then determine the types and positions of the determined number of the containers, and then arrange the containers in the map. Then, it is possible to allow the user having finished the game to gain the items to be assigned to the containers.

In accordance with one of some embodiments, there is provided the game system, wherein, in the container process, the processor may change the items to be assigned to the containers or the selection conditions of the items according to a game result of the game.

As a result, in some embodiments, it is possible to change the items gainable by the user from the containers and the gaining modes of the items in various manners according to the game result of the user.

In accordance with one of some embodiments, the game system, may comprise a memory that stores number setting information and position setting information of the containers as container information, wherein, in the container process, the processor may determine the number and positions of the containers based on the number setting information and the position setting information stored in the memory.

As a result, in some embodiments, storing the number setting information and the position setting information in the memory makes it possible to arrange the appropriate number of the containers at the positions in each map where the user plays the game.

In accordance with one of some embodiments, there is provided the game system may comprise a memory that stores container lottery probability information and item lottery probability information as container information, wherein, in the container process, the processor may determine the types of the containers and the items to be assigned to the containers based on the container lottery probability information and the item lottery probability information stored in the memory.

As a result, in some embodiments, storing the container lottery probability information and the item lottery probability information in the memory makes it possible to execute the determination process of the types of the containers and the items to be assigned to the containers with the container lottery probability information and the item lottery probability information as the selection conditions.

In accordance with one of some embodiments, there is provided the game system wherein, in the container process, the processor may set the number of the containers, the types of the containers, or the positions of the containers based on user information of the user.

As a result, in some embodiments, it is possible to arrange the containers in the appropriate settings of number, types, or positions according to the user information.

In accordance with one of some embodiments, there is provided the game system, wherein, in the container process, the processor may perform a change process of changing the number of the containers, the types of the containers, or the positions of the containers based on items or game points used by the user.

As a result, in some embodiments, by using the specific items or his/her game points, the user can change the number, types, or positions of the containers in the map, and thus the user can make his/her gameplay advantageous, for example.

In accordance with one of some embodiments, there is provided the game system, wherein, in the container process, the processor may change the items to be assigned to the containers or the selection conditions of the items when the change process is performed.

As a result, in some embodiments, by using the specific items or game points, the user can change not only the number, types, or positions of the containers but also the items gained from the containers and the selection conditions of the items.

In accordance with one of some embodiments, there is provided the game system, wherein, in the container process, the processor may change the types of the containers, the items to be assigned to the containers, or the selection conditions of the items according to game status after the arrangement of the containers in the map.

As a result, in some embodiments, it is possible to change the types of the containers or change the items gainable from the containers or the selection conditions of the items reflecting the game status after the arrangement of the containers in the map.

In accordance with one of some embodiments, there is provided the game system, wherein, in the container process, the processor may change the types of the containers, the items to be assigned to the containers, or the selection conditions of the items according to the map information in the map at the positions of the containers.

As a result, in some embodiments, it is possible to change the types of the containers or change the items gainable from the containers or the selection conditions of the items reflecting the map information at the positions of the containers.

In accordance with one of some embodiments, there is provided the game system, wherein, in the game process, the processor may perform the game process where a plurality of users play the game, and in the container process, the processor may determine the number of the containers, the types of the containers, the positions of the containers, or the items to be assigned to the containers for each user of the plurality of users.

As a result, in some embodiments, the number, types, or the positions of the containers or the items gained from the containers differ according to the user, thereby improving the exciting aspect of the game communally played by the plurality of users.

In accordance with one of some embodiments, there is provided the game system, wherein, in the container process, the processor may change the items to be assigned to the containers or the selection conditions of the items according to a game result of the each user.

As a result, in some embodiments, at the game communally played by the plurality of users, it is possible to implement the gaining process of items reflecting the game result of each user. This improves the exciting aspect of the communally played game and the users' immersion in and enthusiasm for the game.

In accordance with one of some embodiments, there is provided a processing method comprising: a moving body process of moving a moving body in a map of a game space; a game process of a game where a user is allowed to gain containers arranged in the map while moving the moving body in the map; and a container process that is a process on the containers, in the container process, processes of determining the number of the containers, the types of the containers, the positions of the containers, and items to be assigned to the containers are performed according to given selection conditions.

In accordance with one of some embodiments, there is provided a computer-readable information storage medium storing a program for causing a computer to perform the above processing method.

Although the present embodiments have been described in detail above, those skilled in the art will readily appreciate that many modifications are possible in the embodiment without materially departing from the novel teachings and advantages of the present disclosure. Accordingly, all such modifications are intended to be included within the scope of the present disclosure. For example, each the terms (such as a character or lottery process) that are at least once written together with a term (such as a moving body or selection process) of a wider sense or an alternative term in the specification or the drawings can be replaced with the alternative term at any part of the specification or the drawings. In addition, the moving body process, the game process, the container process, the determination processes of the number, types, and positions of the containers, the determination process of items corresponding to the containers, the lottery process, and others are not limited to those described in relation to the present embodiment but methods equivalent to the foregoing processes are also included in the scope of the present disclosure.

What is claimed is:

1. A game system comprising a processor including hardware,
    the processor being configured to perform:
        a moving body process of moving a moving body in a map of a game space;
        a game process that is a process of a game where a user is allowed to gain containers arranged in the map while moving the moving body in the map; and
        a container process that is a process on the containers, the container process including (i) determining, before the user starts the game, a number of the containers or positions of the containers arranged in the map based on user information, and (ii) determining items to be assigned to the containers according to given selection conditions, wherein
    the user information includes at least one of a gameplay level, status parameters including experience values gained in the game, a play time of the game, a number of counts of gameplay, payment information of the user, and attribute information of the moving body.

2. The game system as defined in claim 1, wherein,
    in the container process, the processor determines the number of the containers, then determines one of the types and positions of the containers, and then determines the other of the types and positions of the containers.

3. The game system as defined in claim 1, wherein,
    in the container process, the processor determines the number of the containers, the types of the containers, and the positions of the containers before the user starts the game, and determines the items to be assigned to the containers in a period from the start of the game to the end of the game.

4. The game system as defined in claim 3, wherein,
    in the container process, the processor changes the items to be assigned to the containers or the selection conditions of the items according to a game result of the game.

5. The game system as defined in claim 1, comprising
    a memory that stores number setting information and position setting information of the containers as container information, wherein,
    in the container process, the processor determines the number and positions of the containers further based on the number setting information and the position setting information stored in the memory.

6. The game system as defined in claim 1, comprising
    a memory that stores container lottery probability information including lottery probabilities of the types of the containers, wherein,
    in the container process, the processor determines the types of the containers based on the container lottery probability information stored in the memory.

7. The game system as defined in claim 1, wherein,
    in the container process, the processor performs a change process of changing the number of the containers, the types of the containers, or the positions of the containers based on items or game points used by the user.

8. The game system as defined in claim 7, wherein,
    in the container process, the processor changes the items to be assigned to the containers or the selection conditions of the items when the change process is performed.

9. The game system as defined in claim 1, wherein, in the container process, the processor changes the types of the containers, the items to be assigned to the containers, or the selection conditions of the items according to game status after the arrangement of the containers in the map.

10. The game system as defined in claim 1, wherein,
    in the container process, the processor changes the types of the containers, the items to be assigned to the containers, or the selection conditions of the items according to map information in the map at the positions of the containers.

11. The game system as defined in claim 1, wherein,
    in the game process, the processor performs the game process where a plurality of users play the game, and
    in the container process, the processor determines the number of the containers, the types of the containers, the positions of the containers, or the items to be assigned to the containers for each user of the plurality of users.

12. The game system as defined in claim 11, wherein,
    in the container process, the processor changes the items to be assigned to the containers or the selection conditions of the items according to a game result of the each user.

13. A processing method comprising:
    a moving body process of moving a moving body in a map of a game space;
    a game process of a game where a user is allowed to gain containers arranged in the map while moving the moving body in the map; and
    a container process on the containers, the container process including (i) determining, before the user starts the game, a number of the containers or positions of the containers arranged in the map based on user information, and (ii) determining items to be assigned to the containers according to given selection conditions, wherein the user information includes at least one of a gameplay level, status parameters including experience values gained in the game, a play time of the game, a number of counts of gameplay, payment information of the user, and attribute information of the moving body.

14. A non-transitory computer-readable information storage medium storing a program for causing a computer to perform the processing method as defined in claim 13.

* * * * *